United States Patent
Alizadeh-Shabdiz et al.

(10) Patent No.: US 10,491,563 B2
(45) Date of Patent: Nov. 26, 2019

(54) DETERMINING FIXED/MOBILE AND PROXY/NON-PROXY NETWORK ADDRESSES

(71) Applicant: Skyhook Wireless, Inc., Boston, MA (US)

(72) Inventors: Farshid Alizadeh-Shabdiz, Wayland, MA (US); Nicolas Brachet, Newton, MA (US); Andrei Dancus, Burlington, MA (US); Russel Kipp Jones, Roswell, GA (US); Edward James Morgan, Needham, MA (US); George Polak, Charlestown, MA (US); Christopher Steger, Boston, MA (US); Richard Sutton, Cambridge, MA (US)

(73) Assignee: Skyhook Wireless, Inc., Boston, MA (US)

( * ) Notice: Subject to any disclaimer, the term of this patent is extended or adjusted under 35 U.S.C. 154(b) by 41 days.

(21) Appl. No.: 14/329,490

(22) Filed: Jul. 11, 2014

(65) Prior Publication Data
US 2015/0019720 A1 Jan. 15, 2015

Related U.S. Application Data

(60) Provisional application No. 61/845,708, filed on Jul. 12, 2013.

(51) Int. Cl.
*H04W 4/029* (2018.01)
*H04L 29/12* (2006.01)
(Continued)

(52) U.S. Cl.
CPC ...... *H04L 61/2007* (2013.01); *H04L 43/0876* (2013.01); *H04L 61/1505* (2013.01);
(Continued)

(58) Field of Classification Search
None
See application file for complete search history.

(56) References Cited

U.S. PATENT DOCUMENTS 6,757,740 B1  6/2004  Parekh et al.
6,839,680 B1  1/2005  Liu et al.
(Continued)

FOREIGN PATENT DOCUMENTS

CN    101989951 A  *  3/2011
CN    101989951 A  *  3/2011
(Continued)

OTHER PUBLICATIONS

Ficek, Michal, et al., "Spatial Extension of the Reality Mining Dataset," Mobile Adhoc and Sensor Systems (Mass), 2010 7th International Conference, IEEE, Piscataway, NJ, USA, Nov. 8, 2010, pp. 666-673.

(Continued)

*Primary Examiner* — Sargon N Nano
*Assistant Examiner* — Christopher B Robinson
(74) *Attorney, Agent, or Firm* — James A. Blanchette; Cesari and McKenna, LLP

(57) ABSTRACT

In one embodiment, a processing technique is provided for determining a refined attribute of a network address based on one or more other attributes. A network address associated with a source device in communication with a network is observed. One or more first attributes of the network address are determined, where the one or more first attributes indicate at least a spatial or temporal property of the network address. The one or more first attributes are processed to determine a second attribute to be associated with the network address, where the second attribute indicates whether the network address is a fixed or mobile network address, or is a proxy or non-proxy network address. A (Continued)

record is stored that maintains the association between the second attribute and the network address.

11 Claims, 17 Drawing Sheets

(51) Int. Cl.
  *H04L 29/08* (2006.01)
  *H04L 12/26* (2006.01)
  *H04L 29/06* (2006.01)
  *H04L 12/24* (2006.01)
(52) U.S. Cl.
  CPC ...... *H04L 61/2046* (2013.01); *H04L 63/1408* (2013.01); *H04L 67/30* (2013.01); *H04W 4/029* (2018.02); *H04L 41/0846* (2013.01); *H04L 61/6004* (2013.01); *H04L 67/22* (2013.01)

(56) References Cited

U.S. PATENT DOCUMENTS

| | | | |
|---|---|---|---|
| 7,062,572 B1 | 6/2006 | Hampton | |
| 7,424,742 B1 | 9/2008 | Dash et al. | |
| 7,454,523 B2 | 11/2008 | Chow et al. | |
| 7,471,954 B2 | 12/2008 | Brachet | |
| 7,493,127 B2 | 2/2009 | Morgan et al. | |
| 7,515,546 B2 | 4/2009 | Gaspard | |
| 7,752,210 B2 | 7/2010 | Riise et al. | |
| 7,809,857 B2 | 10/2010 | Anderson et al. | |
| 7,937,336 B1 | 5/2011 | Maynard-Zhang et al. | |
| 8,615,605 B2 | 12/2013 | Yu et al. | |
| 8,625,463 B2 | 1/2014 | Gantenbein et al. | |
| 8,656,026 B1 | 2/2014 | Prasad et al. | |
| 8,661,119 B1* | 2/2014 | Jindal | H04L 67/02 709/224 |
| 8,682,321 B2 | 3/2014 | Zhu | |
| 8,745,269 B2 | 6/2014 | Parekh et al. | |
| 8,775,629 B1 | 7/2014 | Whittle | |
| 8,789,171 B2 | 7/2014 | Oasipkov et al. | |
| 8,832,832 B1 | 9/2014 | Visbal | |
| 2001/0049620 A1 | 12/2001 | Blasko | |
| 2002/0091568 A1 | 7/2002 | Kraft et al. | |
| 2003/0074471 A1* | 4/2003 | Anderson | H04L 29/12009 709/245 |
| 2004/0059830 A1 | 3/2004 | Brown | |
| 2004/0078489 A1 | 4/2004 | Anderson et al. | |
| 2004/0078490 A1 | 4/2004 | Anderson et al. | |
| 2005/0071417 A1 | 3/2005 | Taylor et al. | |
| 2006/0026267 A1 | 2/2006 | Godin et al. | |
| 2006/0161402 A1 | 7/2006 | Radulovic et al. | |
| 2006/0212601 A1 | 9/2006 | Hampton | |
| 2007/0004427 A1 | 1/2007 | Morgan | |
| 2007/0253413 A1* | 11/2007 | Citron | H04L 29/12783 370/389 |
| 2007/0256122 A1* | 11/2007 | Foo | H04L 63/1433 726/5 |
| 2008/0244046 A1* | 10/2008 | Campbell | H04L 67/20 709/222 |
| 2008/0248813 A1* | 10/2008 | Chatterjee | G01S 1/68 455/456.2 |
| 2009/0019131 A1 | 1/2009 | Ganesan | |
| 2009/0019143 A1 | 1/2009 | Frutiger | |
| 2009/0037602 A1 | 2/2009 | Patel et al. | |
| 2009/0082699 A1 | 3/2009 | Bang et al. | |
| 2009/0119240 A1* | 5/2009 | Fleming | G06F 16/90339 706/46 |
| 2009/0249480 A1* | 10/2009 | Osipkov | H04L 63/1408 726/22 |
| 2009/0319482 A1 | 12/2009 | Norlander et al. | |
| 2010/0083382 A1 | 4/2010 | Farley et al. | |
| 2011/0032870 A1* | 2/2011 | Kumar | H04W 12/12 370/328 |
| 2011/0113116 A1* | 5/2011 | Burdette | H04L 29/12792 709/217 |
| 2011/0179158 A1 | 7/2011 | Donnelly et al. | |
| 2011/0252441 A1 | 10/2011 | Shkedi | |
| 2012/0046045 A1 | 2/2012 | Gupta et al. | |
| 2012/0185503 A1 | 7/2012 | Chamberlain et al. | |
| 2012/0252423 A1 | 10/2012 | Brisebois et al. | |
| 2013/0055309 A1 | 2/2013 | Dittus | |
| 2013/0060639 A1 | 3/2013 | Gadhia et al. | |
| 2013/0060640 A1 | 3/2013 | Gadhia et al. | |
| 2013/0138396 A1 | 5/2013 | Hauffen et al. | |
| 2013/0173791 A1* | 7/2013 | Longo | H04L 29/12056 709/224 |
| 2013/0238812 A1* | 9/2013 | Paunikar | H04L 29/12367 709/238 |
| 2014/0280881 A1* | 9/2014 | Szamonek | H04W 64/00 709/224 |
| 2014/0359747 A1* | 12/2014 | Le | H04L 9/3297 726/10 |
| 2015/0019719 A1 | 1/2015 | Alizadeh-Shabdiz et al. | |
| 2015/0019738 A1 | 1/2015 | Alizadeh-Shabdiz et al. | |
| 2015/0019758 A1 | 1/2015 | Alizadeh-Shabdiz et al. | |
| 2015/0020195 A1 | 1/2015 | Alizadeh-Shabdiz et al. | |
| 2017/0127376 A1 | 5/2017 | Jones et al. | |
| 2018/0173768 A1 | 6/2018 | Troisvallets et al. | |
| 2018/0196778 A1 | 7/2018 | Glaser et al. | |

FOREIGN PATENT DOCUMENTS

| | | |
|---|---|---|
| JP | 2008-536348 A | 9/2008 |
| JP | 2011-103660 A | 5/2011 |
| JP | 2012-145586 A | 8/2012 |
| JP | 2013-137823 A | 7/2013 |
| WO | WO-2012/030122 A2 | 3/2012 |

OTHER PUBLICATIONS

Tsui, Arvin, et al., "Accuracy Performance Analysis between War Driving and War Walking in Metropolitan Wi-Fi Localization," IEEE Transactions on Mobile Computing, vol. 9, No. 11, IEEE Service Center, Los Alamitos, CA, USA, Nov. 1, 2010, pp. 1551-1562.

"Invitation to Pay Additional Fees and Communication Relating to the Results of the Partial International Search," International Filing Date: Jul. 11, 2014, International Application No. PCT/US2014/046352, Applicant: Skyhook Wireless, Inc., dated Oct. 14, 2014, pp. 1-8.

European Search Report, European Application No. 14 747 222.9, PCT/US2014/046352, Applicant: Skyhook Wireless, Inc., dated Sep. 6, 2017, pp. 1-2.

"Notification of Transmittal of the International Search Report and the Written Opinion of the International Searching Authority, or the Declaration," International Filing Date: Jul. 11, 2014, International Application No. PCT/US2014/046352, Applicant: Skyhook Wireless, Inc., dated Dec. 19, 2014, pp. 1-16.

Bennett, Paul N., et al. "Inferring and Using Location Metadata to Personalize Web Search," ACM, Proceedings of the 34th international ACM SIGIR Conference on Research and Development in Information Retrieval, Beijing, China, Jul. 24-28, 2011, pp. 135-144.

* cited by examiner

DETERMINING FIXED/MOBILE AND PROXY/NON-PROXY NETWORK ADDRESSES

RELATED APPLICATIONS

The present application claims priority to U.S. Provisional Patent Application 61/845,708 filed on Jul. 12, 2013 by Farshid Alizadeh-Shabdiz et al., for "Systems and Methods for Associating Attributes with Network Addresses", the contents of which are incorporated by reference herein in their entirety.

BACKGROUND

Technical Field

The present disclosure relates generally to associating attributes with network addresses, and more specifically processing techniques to determine fixed/mobile and proxy/non-proxy network addresses.

Background Information

Providers of compliance, digital rights management (DRM), online commerce, mobile advertising or other types of services may be able to utilize information related to location, time, intent, identity and other qualities of a user or a user's device in providing their services. For example, compliance and DRM related services may use the information to verify the location of a user, and to understand fidelity of that location in order to meet security requirements or contractual obligations. Likewise, online commerce and advertising related services may use the information to change messaging and content to adapt to user's interests. For example, a mobile advertiser may build a campaign that targets consumers who match specific market segments, or who are located in specific places. The information may also be used to advantage with a wide variety of other types of services. However, information describing location, time, intent, identity, and the like is often unavailable to service providers.

In some cases, a network address, for example, an Internet Protocol (IP) address, associated with a user's device may be available. If such network address (e.g., IP address) could be mapped to entries of a data store that accurately and reliable associated information describing location, time, intent, identity, and the like, to network addresses, then useful information may become available to the service provider. However, forming these sorts of associations in the first place poses a number of problems.

Among other problems, some network addresses may be associated with intermediary network devices acting as gateways between an end device and a destination device, thereby obscuring the identity of the end device. The presence of undetected proxy addresses may impact the usefulness of any associations between network addresses and information that may be formed. Similarly, some network addresses may be associated with network devices that are relatively fixed while others may be associated with network addresses that are mobile, regularly moving between networks and forming connections with different network nodes while still maintaining a same network address. Unless these addresses are recognized and handled appropriately, their presence too may impact the usefulness of associations. Accordingly, there is a needed for improved techniques.

SUMMARY

In one embodiment, a processing technique is provided for determining a refined attribute of a network address based on one or more other attributes. A network address associated with a source device in communication with a network is observed. One or more first attributes of the network address are determined, where the one or more first attributes indicate at least a spatial or temporal property of the network address. The one or more first attributes are processed to determine a second attribute to be associated with the network address, where the second attribute indicates whether the network address is a fixed or mobile network address, or is a proxy or non-proxy network address. A record is stored that maintains the association between the second attribute and the network address. It should be understood that the example embodiment discussed in this Summary may include a variety of other features, including other features discussed below, and variations thereof. Further a variety of other embodiments may be utilized. This Summary is intended simply as a brief introduction to the reader, and does not imply that the specific features mentioned herein are all the features of the invention, or are essential features of the invention.

BRIEF DESCRIPTION OF THE DRAWINGS

The Detailed Description below refers to the accompanying drawings of example embodiments, of which.

DETAILED DESCRIPTION

Figure 1:
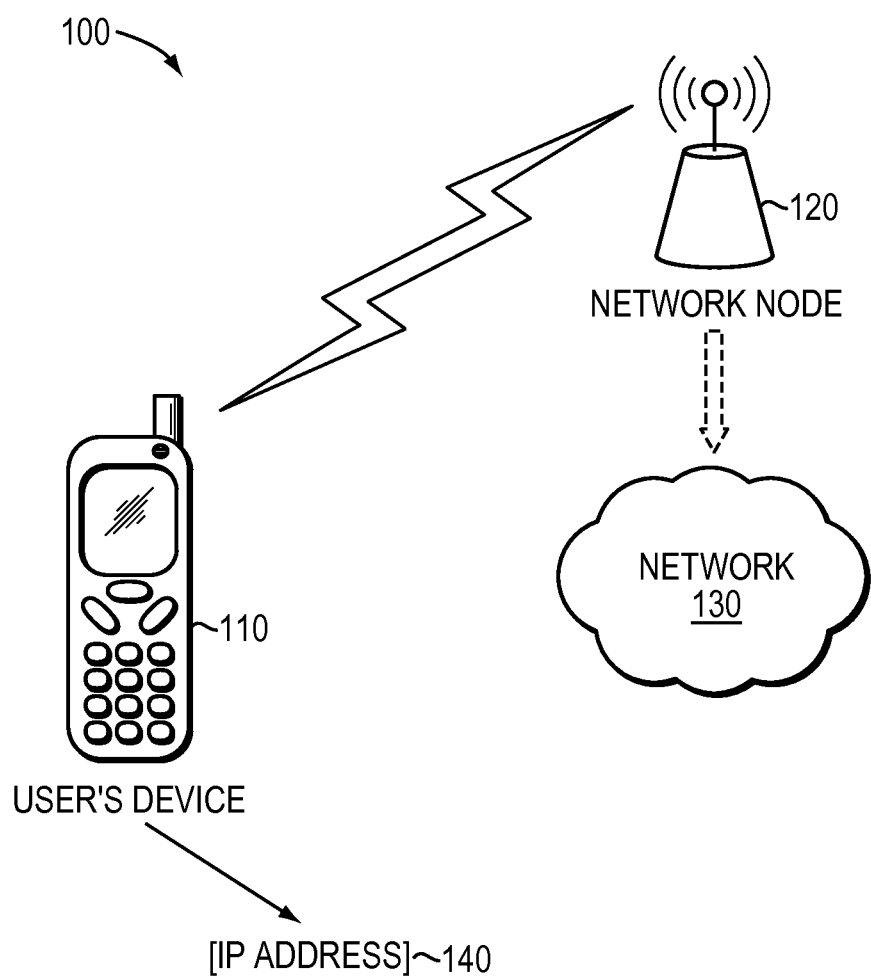
FIG. 1 is a block diagram of an example environment of a user's device.

FIG. 1 is a block diagram of an example environment of a user's device 110. The user's device 110 may be a fixed electronic device, for example, a desktop computer, or a mobile device. As used herein, the term "mobile device" refers to an electronic device designed to be carried on one's person or in a vehicle and having wireless communication capabilities. Examples of a "mobile device" include a smartphone (e.g., an iPhone® available from Apple Computer, Inc.), a tablet computer (e.g., an iPad® available from Apple Computer, Inc.), or other similar devices. The user's device 110 may include a processor coupled to a storage device (e.g. non-volatile or volatile memory, a hard disk, a solid state storage device (SSD), or other data store), as well as one or more communication interfaces. The storage device may store executable instructions that include instructions for an operating system and one or more applications. The operating system may be an iOS® operating system available from Apple Computer Inc., or another similar operating system. The applications on the user's device 110 may provide, and/or may interact with applications on remote servers that provide compliance, digital rights management (DRM), online commerce, mobile advertising or other types of services.

Information related to location, time, intent, identity and other qualities of a user of the user's device 110 may be of interest when providing these, and other types of services. For example, compliance and DRM related services may be concerned with verifying the location of the user and understanding fidelity of that location in order to meet security requirements or contractual obligations. Online commerce and advertising related services may be concerned with the identities and intents of consumers, changing messages and content to adapt to user interests. For example, a mobile advertiser may build a campaign that targets consumers who match specific market segments or who are located in specific places. Likewise, this sort of information may be of interest to other types of services.

The user's device 110 may be in communication with a network node 120, for example a Wi-Fi access point or cell tower, which provides access to a network 130, for example, an IP-based network, a Global System for Mobile Communications (GSM) cellular network, etc. The user's device 110 may be associated with a network address, for example used by the network 130. The network address may be an IP address 140, or, alternatively, another type of address, for example, a media access control (MAC). In order to obtain information related to location, time, intent, identity and other qualities, a service provider may map the network address of the user's device 110 against a database of stored profiles that maintain associations between network addresses and attributes. As used herein, the term "attribute" refers to a piece of information that exists independent from a network address that describes a quality of (e.g., location of, time of, intent of, identity of, etc.) a subject. Provided these associations are accurate and reliable, a service provider can obtain the desired location, time, intent, identity or other information simply by knowing a network address associated with the user's device. However, building such profiles that maintain associations between network addresses and attributes presents a wide variety of challenges. The below description details techniques for overcoming such challenges, to build associations between network addresses and attributes.

Overview of Network Address to Attribute Association System

Figure 2:
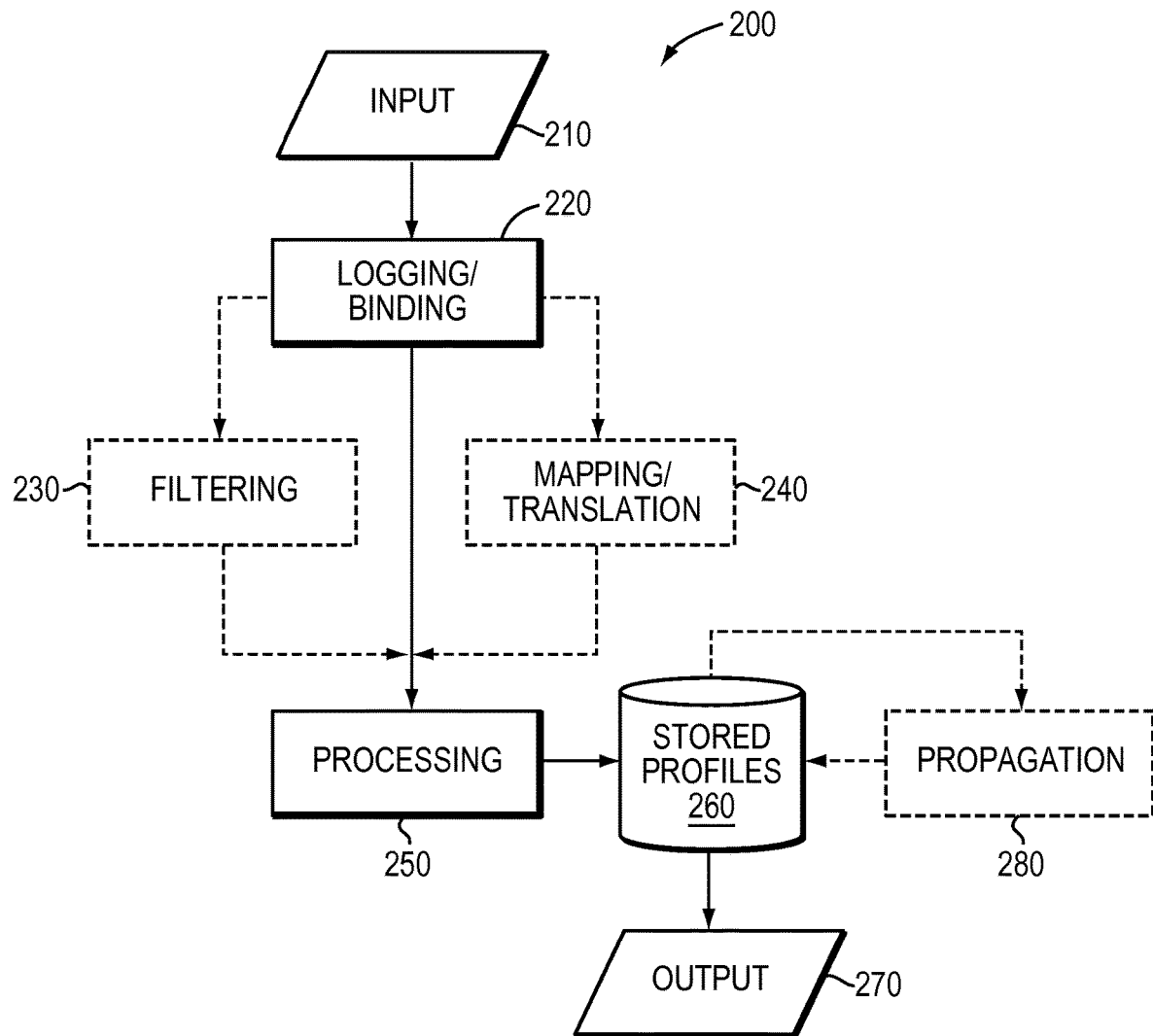
FIG. 2 is a high-level block diagram of an example network address to attribute association system.

FIG. 2 is a high-level block diagram of an example network address to attribute association system 200. The network address to attribute association system may take the form of executable instructions for execution by one or more processors of one or more electronic devices, for example, one or more servers. The executable instructions may be maintained in one or more memories of the electronic devices (e.g., servers), on other types of electronic-device readable media, coupled to the processors.

The network address to attribute association system 200 may operate to take directly observed attributes, associate them with network addresses (e.g., IP addresses) and then derive therefrom refined attributes. As used herein, the term "directly observed attribute" refers to an attribute that comes from raw or minimally processed observations of one or more source devices. As used herein, the term "refined attribute" refers to an attribute that is derived (e.g., through filtering, mapping, processing and/or propagation) from one or more directly observed attributes. Such refinement, among other advantages, may reduce false alarm probability and miss probability. False alarm probability is the likelihood that a network address will mistakenly be identified as a member of a class or group when in fact it is not. Miss probability is the likelihood that a network address will not be identified as a member of a class or group when in fact it is a member of the class or group. In general, it is desirable to minimize or reduce both the false alarm and miss probabilities.

The network address to attribute association system 200 may receive input 210. The input 210 may be observations (i.e. network address observations) that include a network address (e.g. an IP address 140) associated with a source device 305 that is making or otherwise involved in the observation (e.g., assigned to the source device 305, or to an intermediary device) and one or more directly observed attributes. The source device may be a user's device or some other device used in collecting observations. The input 210 may be passed to a logging/binding software module 220. The logging/binding software module 220 may operate to gather observations and generate records (e.g., IP records) that maintain an association between a network address and one or more attributes. The logging/binding software module 220 may pass the records to an optional filtering software module 230 and/or an optional mapping/translation module 240.

The filtering software module 230 may assess the quality of the observations and identify aberrant information, i.e. noisy, unreliable or otherwise incorrect information that, if allowed to remain, may cause the network address to attribute association system 200 to yield less useful results.

The mapping/translating software module 240 may translate attributes, by mapping attributes of one type into another type. For example, mapping one or more directly observed attributes to one or more secondary attributes that were not directly observed. Such mapping may permit associations to be formed to attributes that are not directly observable, or where associations to certain attributes are prohibited from being maintained, due to privacy obligations, or other contractual or regulatory obligations.

Records from the logging/binding software module 220, the filtering software module 230 and/or the mapping/translation software module 240, are passed to the processing software module 250. The processing software module 250 may derive more refined attributes from multiple observations in the supplied records that, for example, may be unreliable or impossible to derive from individual observations. The processing software module 250 may apply clustering techniques, classification techniques, characterization techniques, as well as a variety of other types of techniques. Associations between network addresses and refined attributes from the processing software module 250 may be stored, for example, in a database of stored profiles 260. The associations from the database of stored profiles 260 may be directly provided as output 270, to providers of compliance, digital rights management (DRM), online commerce, mobile advertising or other types of services.

Alternatively, the refined attributes may be further refined by a propagation software module 280. The propagation software module 280 may propagate attributes associated with one network address to be associated with one or more other network addresses determined to be sufficiently similar based on a similarity criteria. In this manner, an attribute that was not directly observed in connection with a network address, or that could not be derived through processing of observations of the network address, may still be associated with the network address. Results of the propagation software module 280 may be provided back to the database of stored profiles 260, and provided as output 270.

Logging/Binding Software Module

Figure 3:
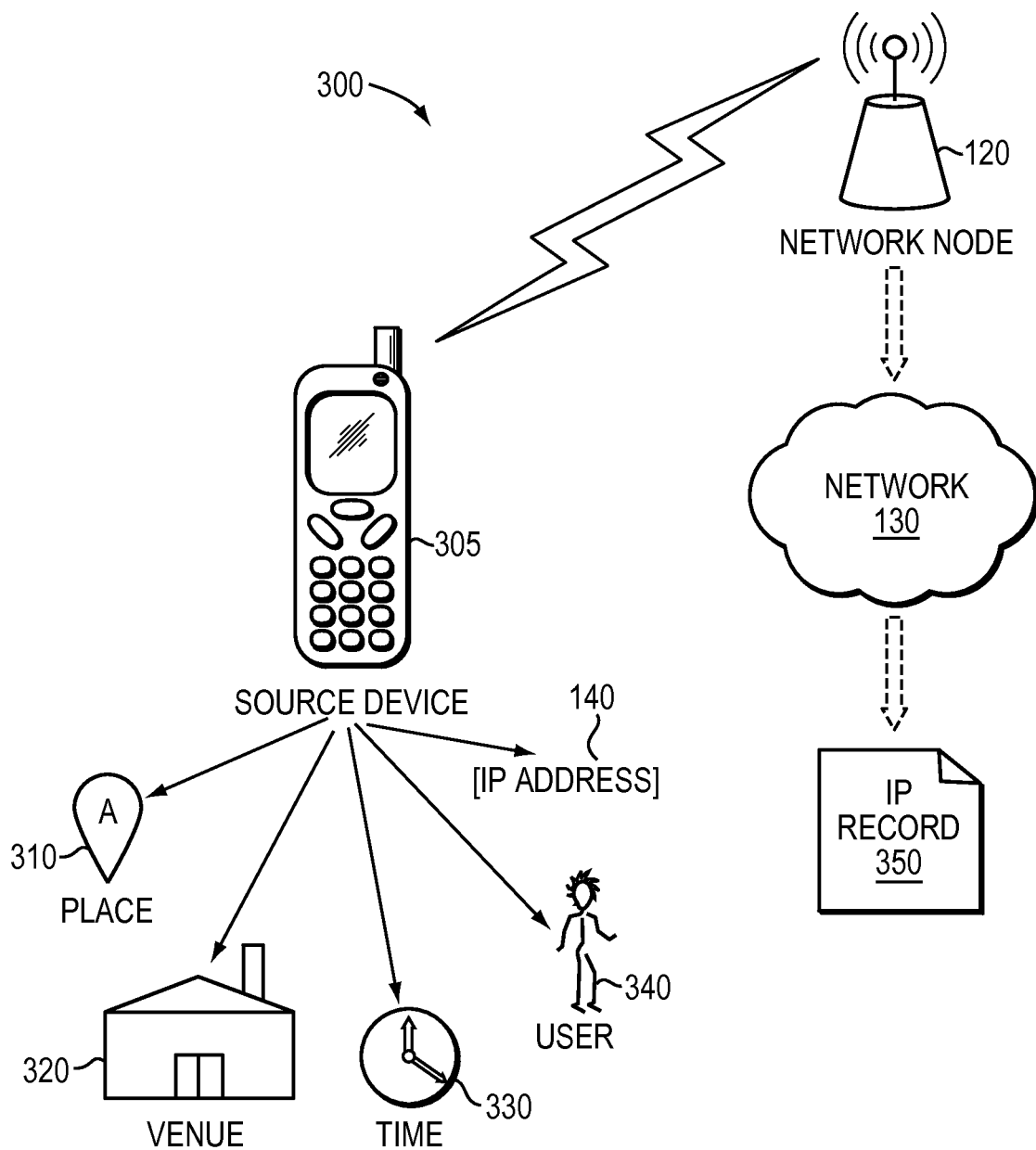
FIG. 3 is a block diagram illustrating an example of the formation of associations between one or more directly observed attributes and a network address.

The logging/binding software module 220 may operate to gather the one or more directly observed attributes and associate (e.g., bind) them to a network address (e.g. the IP address). FIG. 3 is a block diagram illustrating an example of the formation of associations between one or more directly observed attributes 310-340 and a network address (e.g., an IP address 140). Prior to their receipt as input 210 to the logging/binding software module 220, the directly observed attributes may have been captured by the source device 305, captured from a non-source device (e.g., a network node 120), derived from information transmitted by the source device 305 (e.g., from signals observed by the source device), derived from information gathered by a non-source device (e.g., derived from signals observed by the network node 120), or captured in some other manner. The logging/binding software module 220 generates a network address record (e.g., IP record 350) that associates the network address (e.g., IP address 140) and the directly observed attributes. The exact manner of formation of the network address record (e.g., IP record 350) may differ depending on the type of attribute.

The directly observed attributes may include location-related attributes, time/place-related attributes, user/device-related attributes, application-related attributes, network/network node-related attributes, among other general types of attributes. Location-related attributes may include a place (e.g., supplied by the source device 305, determined based on signals observed by the source device, for example, pursuant to WiFi or cellular positioning, determined by the network 130, determined based on signals observed by one or more network nodes 120, etc.), attributes of the place, a nearby venue or point-of-interest (POI), attributes of the venue or POI, etc. A record (e.g., IP record 350) may be generated maintaining an association between the network address (e.g., IP address 140) and the place or venue/POI itself, an attribute of the place or venue/POI, a class or group describing the place or venue/POI, or some other type of information.

Time/place-related attributes may include a place and time of network address observations, or an attribute of a place and time of network address observations. A network address record (e.g., IP record 350) may be generated maintaining an association between the network address and the place and time, or the attribute of the place and time.

User/device related attributes may include an identifier (e.g., a device ID) corresponding to a device associated with the network address or its user, a property of the device or user (e.g., a user's demographic profile), a third party identifier associated with the device or user (e.g., an iOS® Identifier for Advertisers (IDFA)), or a class or group associated with the device or user (e.g., a user segment such as "college student"). A network address record (e.g., IP record 350) may be generated maintaining an association between the network address and the identifier, third party identifier, or class or group, as the case may be.

Application-related attributes may include an identifier of one or more applications running on a device associated with the network address or having initiated a transmission from the device. A network address record (e.g., IP record 350) may be generated maintaining an association between the network address with the application.

Finally, network/network node-related attributes may include an identifier of a specific network 130 (e.g., a mobile network code (MNC) of a GSM cellular network), a service provider of the network 130 (e.g., based on a Wi-Fi Service Set Identifier (SSID)), or a communication standard used (e.g., the Universal Mobile Telecommunications System (UMTS) standard) by a device associated with the network address. Likewise, the network/network node-related attributes may include an identifier of a specific network node 120, class or group of network nodes 120, service provider operating the network node 120, or communication standard of the network node 120. Again, a network address record (e.g., IP record 350) may be generated maintaining the association.

Figure 4:
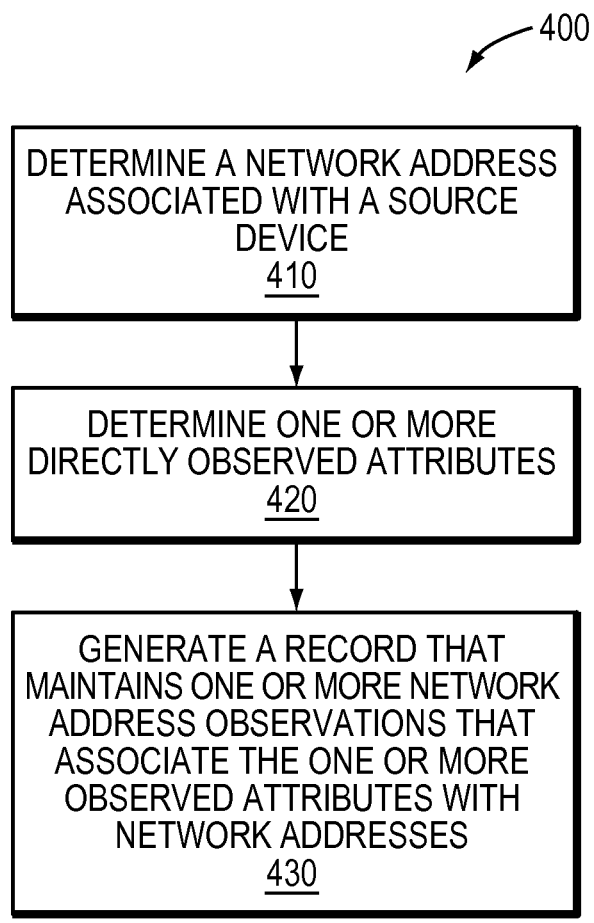
FIG. 4 is a flow diagram showing a generalized example sequence of steps that may be implemented by a logging/binding software module.

To summarize, the logging/binding software module 220 may operate to gather one or more directly observed attributes and associate them with a network address. FIG. 4 is a flow diagram showing a generalized example sequence of steps 400 that may be implemented by a logging/binding software module 220. Such steps provide a high level summary of operation, and omit many of the specific details described above. At step 410, the logging/binding software module 220 determines (e.g., from the received input 210) a network address associated with a source device 305 in communication with a network 130 via a network node 120. At step 420, the logging/binding software module 220 determines (e.g., from the received input 210) one or more directly observed attributes. At step 430, the logging/binding software module 220 generates a record (e.g., an IP record) that maintains one or more observations that associate the one or more observed attributes with the network address. The record may be stored in a storage device, for example, in a memory.

Filtering Software Module

The filtering software module 230 operates to assess the quality of the network address observations and either provides one or more indications of suitability of observations of observations, or removes observations that, if allowed to remain, may cause the network address to attribute association system 200 to yield less useful results. Observations may contain noisy, unreliable or otherwise incorrect information, generally rendering them unsuitable for use in associating network addresses with attributes. For example, some source devices may obfuscate their device identifiers, for example, rendering any associations between network addresses derived from the observation uninformative or even misleading. Likewise, some location information providers may report unreliable locations that could distort spatial conclusions. The filtering software module 230 may implement one or more of a set of filtering techniques to identify observations as suitable/unsuitable with an indicator or remove observations, as the case may be.

Figure 5:
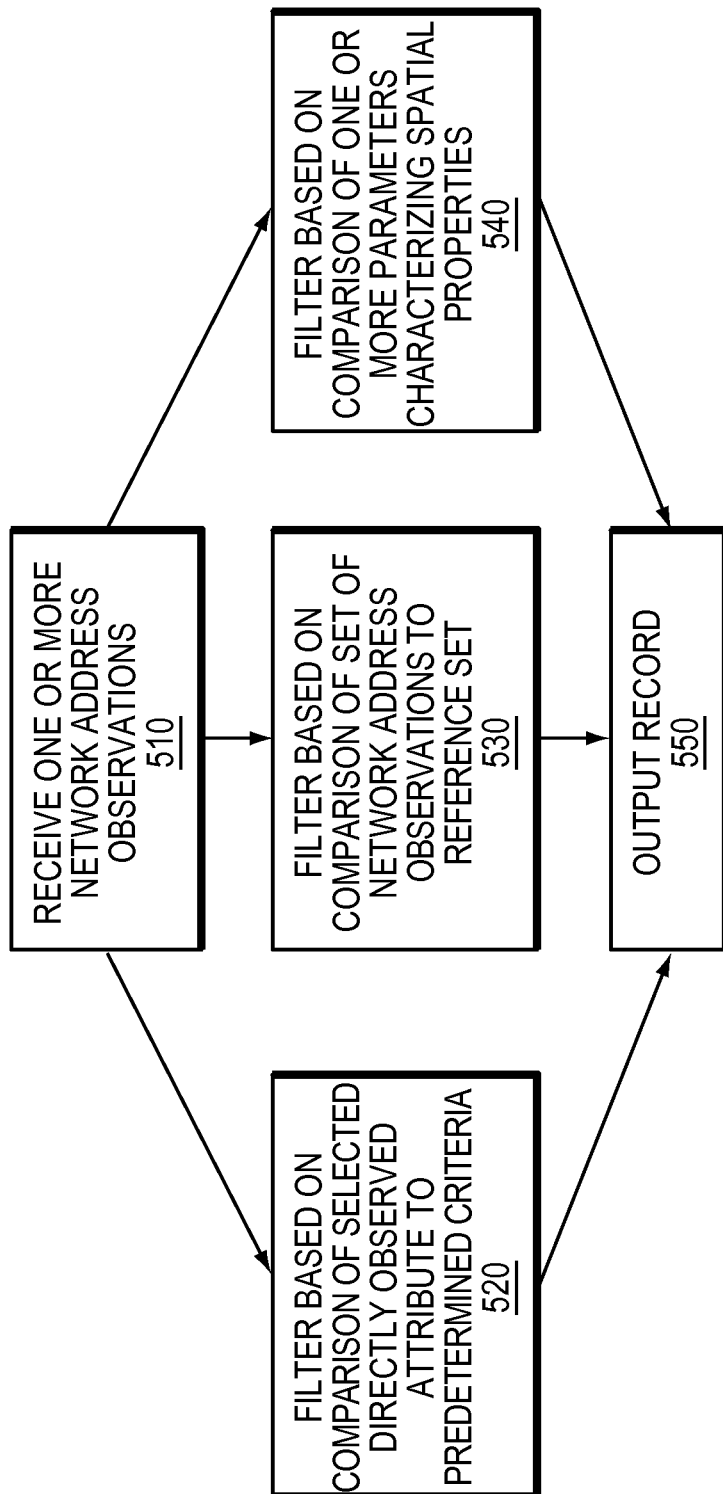
FIG. 5 is a flow diagram showing a generalized example sequence of steps that may be implemented by a filtering software module.

FIG. 5 is a flow diagram showing a generalized example sequence of steps 500 that may be implemented by a filtering software module 230. At step 510, one or more network address observations are received that associate a network address with one or more directly observed attributes. At steps 520-540, the filtering software module 230 applies one or more filtering techniques to the observations (e.g., one of steps 520-540 may be performed, or multiple ones of steps 520-540 may be performed).

At step 520, the filtering software module 230 may filter based on a comparison of a selected directly observed attribute to a predetermined criteria that indicates suitability of the network address observation for association of the network address with one or more attributes. The filtering either provides an indication of the suitability/unsuitability of the observation for use in associating the network address with the one or more attributes, or removes the observation, based on the comparison of the selected directly observed attribute. The selected directly observed attribute may be a location data source (e.g., global positioning system (GPS) positioning, cellular positioning, Wi-Fi positioning, etc.), and the comparison to a type of location data source determined to have low accuracy. Alternatively, the selected directly observed attribute may be a provider of observations, and the comparison to one or more providers known to misrepresent a source of data. In yet another alternative, the selected directly observed attribute may be a device identifier, and the comparison may be to a device identifier of a device type known to have a defect (e.g., a defect that compromises GPS performance). In still another alternative, the selected directly observed attribute may be a location error metric (e.g., horizontal position error (HPE)), and the comparison to an allowed error threshold. In still another alternative, the selected directly observed attribute may be an indicator of location error (e.g., number of satellites used or horizontal dilution of position (HDOP) for GPS positioning, coverage area of cell towers for cellular positioning, etc.), and the comparison to a threshold associated with the indicator of location error. In still further alternatives, the selected directly observed attribute may be some other attribute related to noisy, unrelaible or otherwise incorrect information, such as a particular group of users, a network identifier of a particular network, a particular communication standard etc.

At step 530 the filtering software module 230 may filter based on a comparison of a set of network address observations to a reference set of network address observations. The filtering either provides an indication of the suitability/unsuitability of the set of observations for use in associating the network address with the one or more attributes, or removes the set of observations, based on the comparison The comparison may include determining a likelihood that the set of network address observations belongs to a same probability distribution as the reference set of network address observations. For example, a statistical test such as the Student's T test may be employed, where the test is described as:

$$t = \frac{\overline{X} - u}{s} \sqrt{M}$$

$$s = \sqrt{\frac{1}{M} \sum (X - \overline{X})^2}$$

$$\overline{X} = \frac{1}{M} \sum X$$

where t is the test statistic, X is the location of the sample (indexes omitted for simplicity), u is the reference location (mean of the reference sample set), M is the number of samples in the test set, and the Student's T test operates to compare t against a predetermined threshold to decide whether the test set is sufficiently similar to the reference set.

At step 540, the filtering software module 230 may filter based on a comparison of one or more parameters characterizing spatial properties of a set of network address observations. The filtering either provides an indication of the suitability/unsuitability of the set of observations for use in associating the network address with the one or more attributes, or removes the set of observations, based on the comparison. The spatial properties of the set of network address observations may be represented as one or more derived parameters characterizing the network address (e.g., spatial standard deviation). Alternatively, the spatial properties may be a measure of resolution of the set of network address observations. For example, it may be determined that spatial data is derived from a discretized set of regions (e.g., longitude and latitude derived from centroids of zip code polygons). For instance, using a set of reference regions defining the spatial coverage of zip codes, a fraction of zip code regions containing a set of observations with more than one distinct location may be determined. The complementary set of zip code regions having all observations at a single location would indicate the likelihood that some or all locations were being derived from zip code centroids and thus have spatial resolution limited to the zip code level. The fraction may be compared against a threshold to decide whether an effective resolution of the data offers zip code level precision, and filtering performed in response to such decision.

At step 550, the filtering software module 230 may output (e.g., and store in a storage device, at least momentarily), a record that maintains network address observations along with indications of suitability/unsuitability, or that have not yet already been removed.

Mapping/Translation Software Module

The mapping/translating software module 240 may translate the records, by mapping attributes of one type into another type, for example, mapping one or more directly observed attributes to one or more attributes that were not directly observed. Such mapping may permit associations to be formed to attributes that are not directly observable, or where associations to certain attributes are prohibited from being maintained, due to privacy obligations, or other contractual or regulatory obligations. The mapping/translation module may operate on records after execution of the logging/binding software module 220 (i.e. "late binding"), or simultaneous to execution of the logging/binding software module 220 (i.e. "early binding"), in which case the directly observed attributes need not be retained.

For example, certain contractual or regulatory obligations may prohibit retaining associations between a network address and an explicit location where the network address was observed. In such case, the mapping/translation software module 240 may, as part of early binding, map the location attribute to a secondary attribute, such as property values corresponding to the location. The directly observed attribute may be discarded, and the secondary attribute retained, such that the record that is stored maps the network address to a property value. Similarly, the mapping/translation software module 240 may, as part of early binding, map multiple directly observed attributes to multiple other attributes that are retained. For instance, place and time of a network address observation may be mapped to attributes of an individual known to be located (e.g., through a third party information source) at the place at the time, or to transient population statistics for the place and time. These other attributes may be the ones that are retained.

The mapping/translating software module 240 may map attributes based on one or more predefined correspondences, such as spatial, temporal, and/or identity-related correspondences. The mapping may be responsive to a correspondence between one attribute and one other attribute, or a correspondence between multiple attributes and one or more other attributes.

Figure 6:
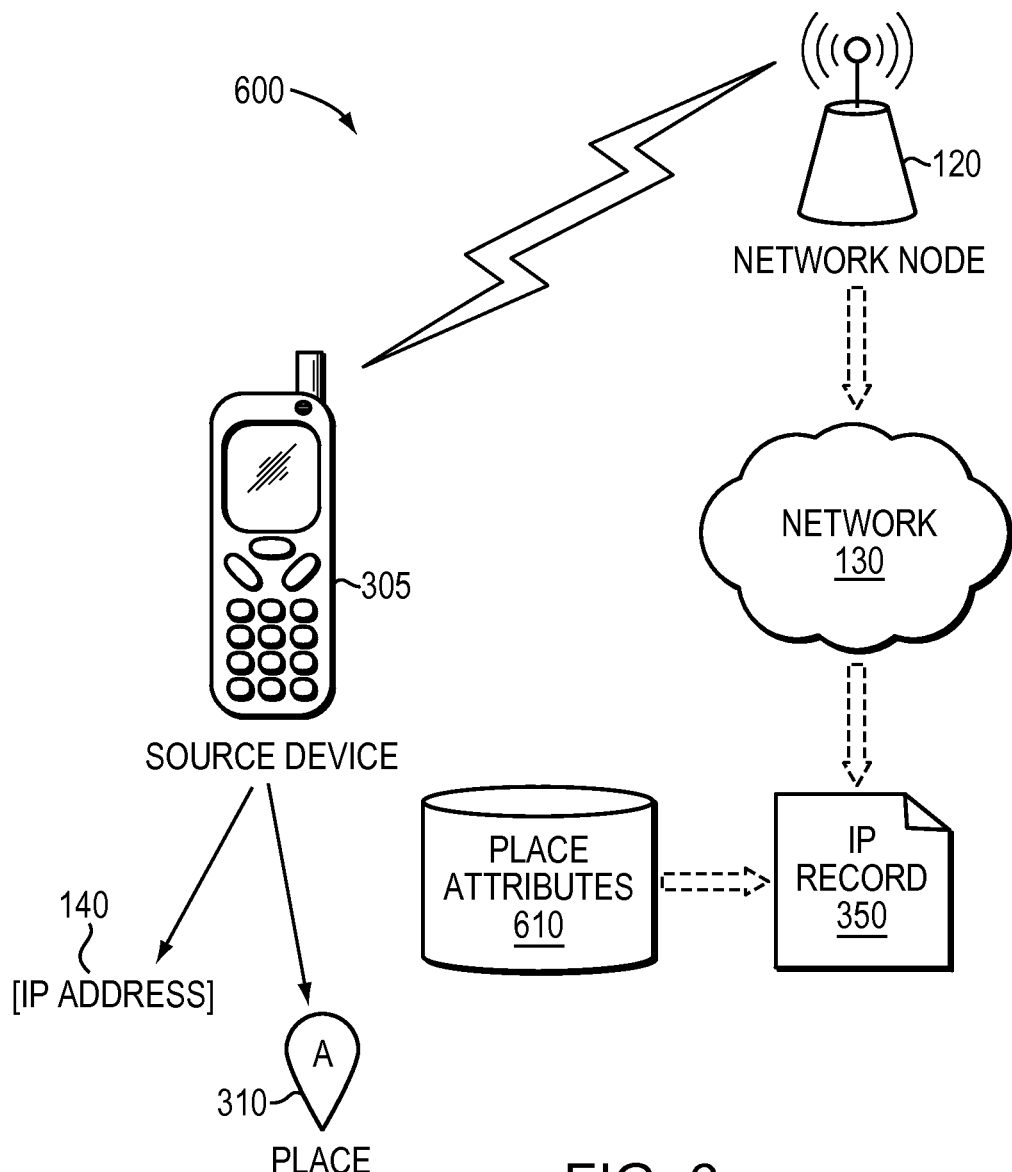
FIG. 6 is a block diagram illustrating an example of mapping a place where an observation of a network address occurred to one or more attributes of the place.

In the case of spatial correspondence, one type of mapping is of a place where an observation of a network address occurred to one or more attributes of the place. As used herein the term "place" refers to an entity having a spatial definition. Examples of places include specified latitude and longitude coordinates, buildings, campuses, cities countries, and arbitrary regions, among other types of entity having a spatial definition. FIG. 6 is a block diagram 600 illustrating an example of mapping a place 310 where an observation of a network address occurred to one or more attributes of the place. The mapping/translating software module 240 may receive an association of a network address (e.g., IP address 140) associated with a source device 305, and a place 310 of the observation. The mapping/translating software module 240 retrieves place attributes 610. The place attributes 610 may be property values, venue identification information, time zone, or other types of attributes. The mapping/translating software module 240 maps the place to the one or more place attributes 610, and stores a record (e.g., an IP record 350) that includes an association between the network address and the one or more place attributes 610.

Another type of mapping based on spatial correspondence is mapping a place where an observation of the network address occurred to one or more attributes associated with a class of places to which the place belongs. For example, the place may be a neighborhood in New York city, and the mapping may be to a population of New York city.

Additional types of mapping based on spatial correspondence may map a place where an observation of the network address occurred to one or more identifiers of individuals who are associated with the place (e.g., that reside at or near the place), or to an attribute of a venue or POI associated with the place.

In the case of temporal correspondence, one type of mapping based on temporal correspondence is mapping a time when an observation of a network address occurred to one or more attributes associated with the time. The mapping/translating software module 240 may receive an association of a network address (e.g., IP address 140) associated with the source device 305, and a time of the observation. The mapping/translating software module 240 may map the time to one or more attributes associated with the time, for example, a day of the week, whether daylight savings time was in effect, etc., and store a record (e.g., an IP record) that includes an association between the network address and the one or more attributes associated with the time.

Another type of mapping based on temporal correspondence is mapping a time when an observation of the network address occurred to one or more attributes associated with a class of time intervals including the time (e.g., hours-of-week, day-of-year, or other periodic intervals).

Figure 7:
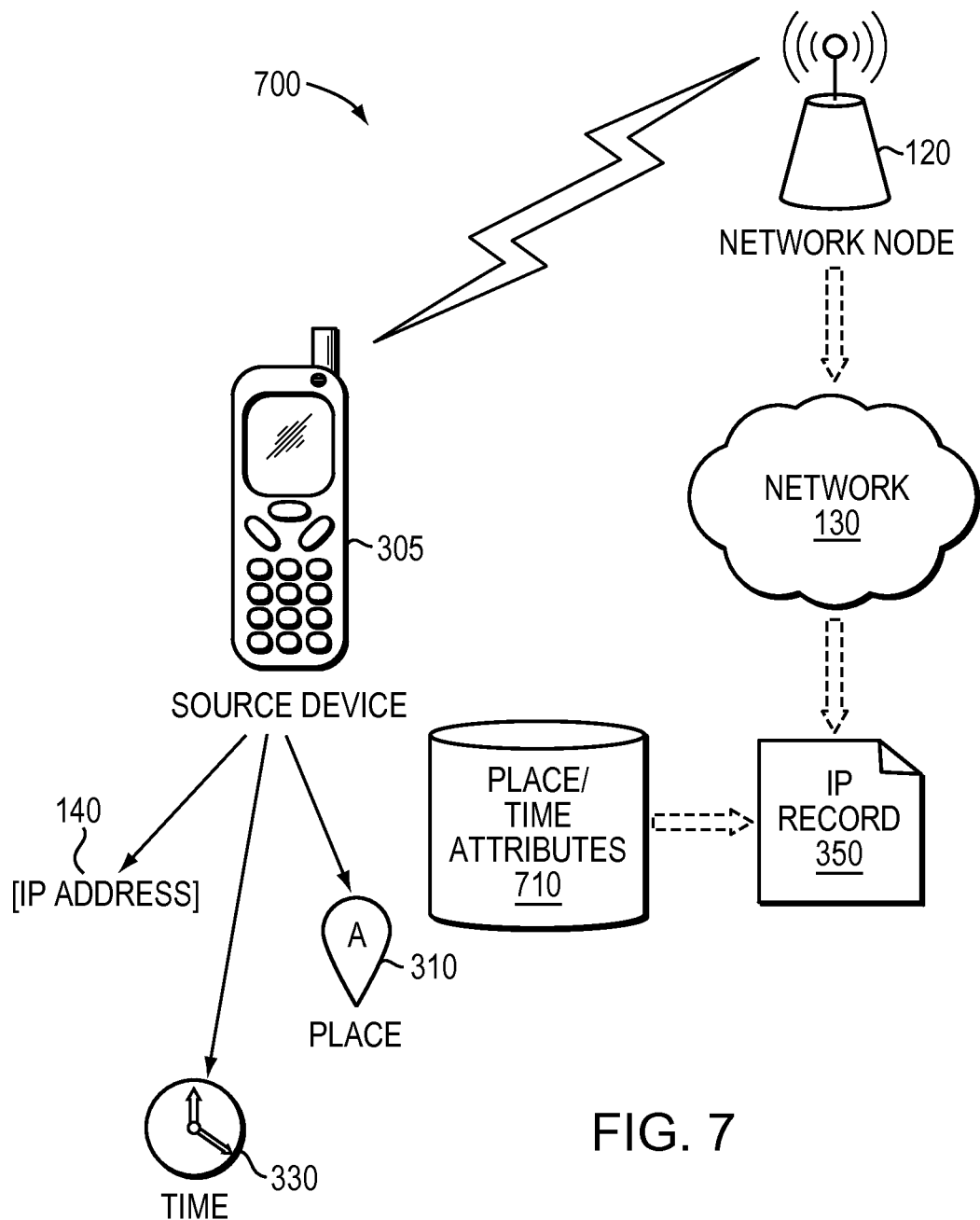
FIG. 7 is a block diagram illustrating an example of mapping a place and time of an observation of a network address to one or more attributes of the place and time.

A variant of temporal correspondence may be spatiotemporal correspondence where place and time of an observation of a network address are mapped to one or more attributes associated with the place and time. FIG. 7 is a block diagram 700 illustrating an example of mapping a place 310 and time 330 of an observation of a network address to one or more attributes of the place and time. The mapping/translating software module 240 may receive an association of a network address (e.g., IP address 140) associated with a source device 305, and a place 310 and time 330 of the observation. The mapping/translating software module 240 also retrieves place/time attributes 710. The place/time attributes 710 may be weather information for the place and time, special event information (e.g., elections, sporting events, concerts, parades, etc.) for the place and time, information relating to the population present at the place and time (e.g., demographics, segments, interests, behaviors, etc.), or some other type of attributes indexed by place and time. The mapping/translating software module 240 maps the place 310 and time 330 to the one or more attributes of the place/time attributes 710, and stores a record (e.g., an IP record 350) that includes an association between the network address and the one or place/time attributes.

Figure 8:
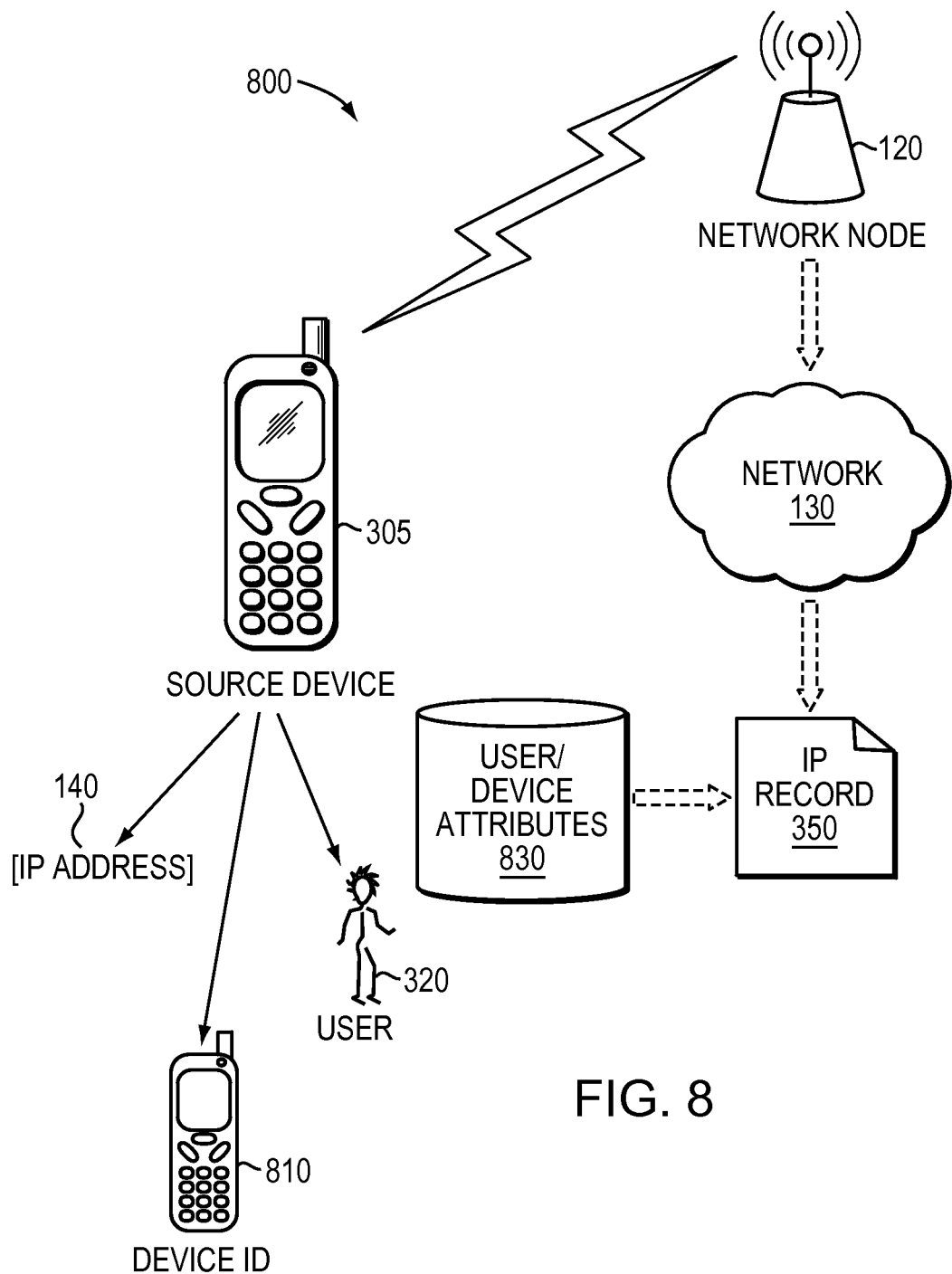
FIG. 8 is a block diagram illustrating an example of mapping a device identifier or user identifier for a source device to one or more attributes of the device identifier or user identifier.

In the case of identity-related correspondence, one type of mapping is mapping a device identifier or user identifier for a source device 305 that was observed with a network address to one or more attributes of the device identifier or user identifier. FIG. 8 is a block diagram 800 illustrating an example of mapping a device identifier or user identifier for a source device 305 to one or more attributes of the device identifier or user identifier. The mapping/translating software module 240 may receive an association of a network address (e.g., IP address 140) associated with a source device 305, and a device identifier 810 or user identifier 820. The mapping/translating software module 240 also retrieves user/device attributes 830. The user/device attributes 830 may be a demographic estimate associated with the user, a third party profile of the user or device, an estimate of home address of the user, or some other type of attributes indexed by user or device. The mapping/translating software module 240 maps the device identifier 810 or user identifier 820 to the one or more user/device attributes 830, and stores a record (e.g., an IP record 350) that includes an association between the network address and the one or user/device attributes.

Additional types of mapping based on identity-related correspondence may map a device identifier or user identifier for a source device 305 that observed a network address to one or more attributes of a class of users or devices to which the user or device identifier belongs (e.g., all Apple iPhone® smartphone users).

Figure 9:
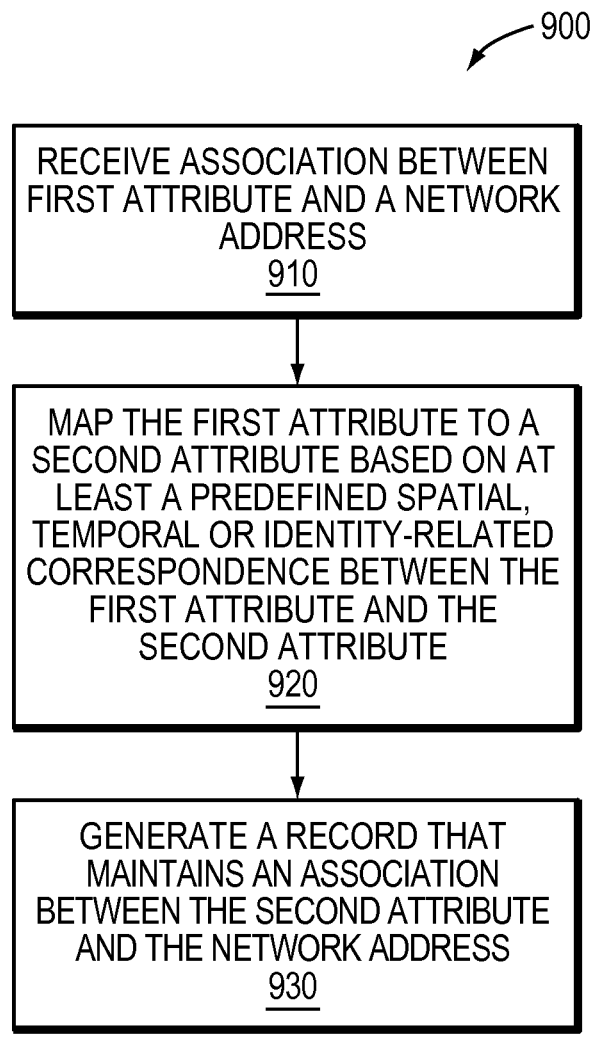
FIG. 9 is a flow diagram showing a generalized example sequence of steps that may be implemented by a mapping/translating software module.

To summarize, the mapping/translating software module 240 may map attributes of one type into another type to permit associations to be formed to attributes that are not directly observable, or where associations to certain attributes are prohibited from being maintained. FIG. 9 is a flow diagram showing a generalized example sequence of steps 900 that may be implemented by the mapping/translating software module 240. Such steps provide a high level summary of operation, and omit many of the specific details described above. At step 910, the mapping/translating software module 240 receives an association between a first attribute and a network address. At step 920, the mapping/translating software module 240 maps the first attribute to a second attribute based on at least a predefined spatial, temporal, or identity-related correspondence between the first attribute and the second attribute, where the second attribute was not directly observed in connection with the network address. The association between the first attribute and the network address may be retained in a first record, stored in a storage device (e.g., a non-volatile or volatile memory, a hard disk, a solid state storage device (SSD), or other data store), or discarded, depending on the implementation. At step 930, a record is generated that maintains an association between the second attribute and the network address. The second record may be stored in the storage device.

Processing Software Module

The processing software module 250 may derive refined attributes from multiple observations in supplied records that, for example, would be unreliable or impossible to derive from individual observations. By looking to multiple observations, insights may be obtained that are not apparent from any one individual observation. The multiple observations may be of a single network address, or of multiple different network addresses that share some common property, and thereby may be grouped. The processing module 250 may execute a wide variety of different processing techniques, either alone or in combinations, to derive refined attributes from multiple observations. The processing techniques may include determining discrete states of a network address, clustering network addresses into groups having common properties, positioning based on clusters of network addresses, classifying network addresses, determining if network addresses belong to intermediary devices such as proxies, determining whether network addresses are fixed or mobile, determining whether network addresses are stable or unstable, characterizing associations between network addresses and attributes, as well as a variety of other techniques. Network address to attribute associations that are formed as a result of processing may be stored in profiles of a database.

a. Determining States

In one technique, the processing software module 250 may determine one or more discrete states of a network address from multiple observations of the network address, and each state may be treated separately for formation of network address to attribute associations. Determining states may be advantageous in a variety of circumstances. For example, a network address may have traits that vary periodically with time (e.g., as in the case of a demographic distribution of users of a network address associated with a transit hub). It may be advantageous to separately derive attributes from multiple observations of the network address at multiple different times. Similarly, network nodes allocating network addresses can follow diverse allocation policies based on their own interests and applications. Each discrete allocation of a network address may exhibit distinct behaviors. It may be advantageous to treat each discrete allocation of a network address as a distinct state, and associate attributes individually.

In addition to determining what constitutes a state, and associating attributes individually with each state, it may be advantageous to determine patterns exhibited by network addresses as they transition between states. For example, some network addresses may exhibit instability by switching rapidly between dramatically different states, while other network addresses may remain stable within a single state for long periods of time.

Figure 10A:
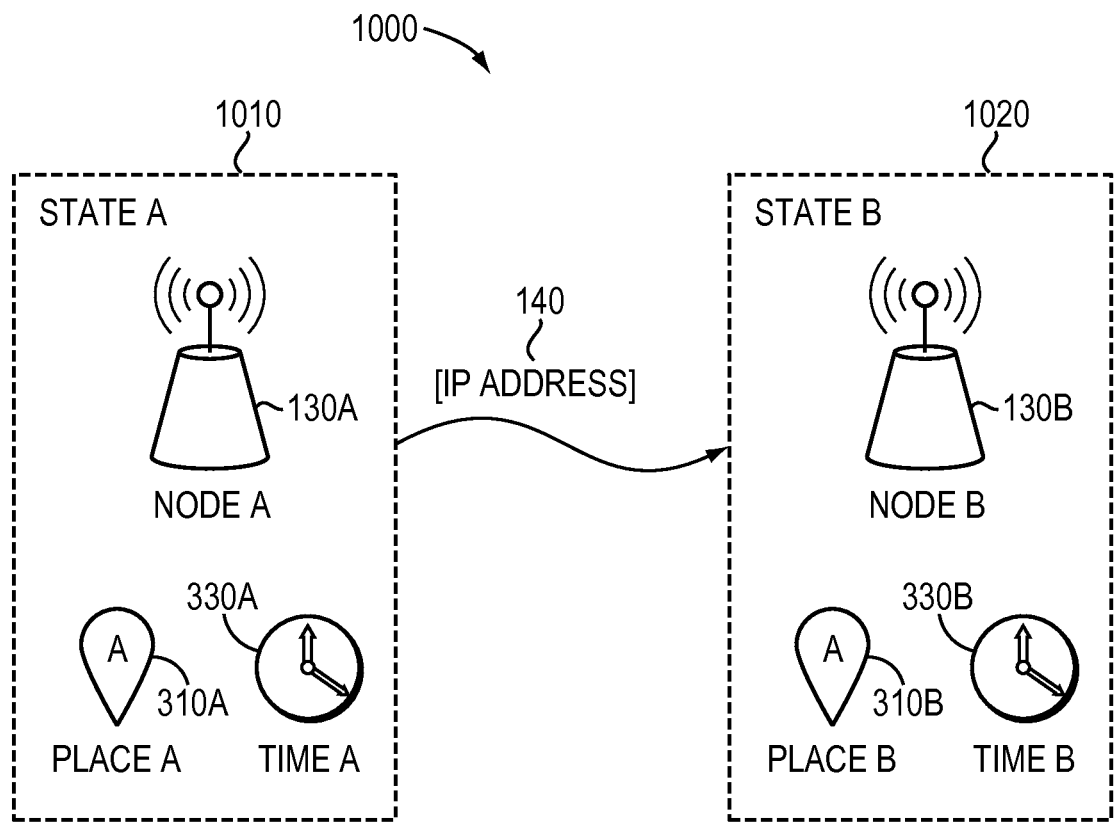
FIG. 10A is a block diagram illustrating an example of determining one or more discreet states that describe distinct modes of operation or allocations of a network address.

FIG. 10A is a block diagram 1000 illustrating an example of determining one or more discreet states 1010, 1020 that describe distinct modes of operation or allocations of a network address (e.g., an IP address 140). In this example, the states may represent different spatiotemporal regions in which the network address is allocated. At a first place 310A and time 330A, a first network node 130A may allocate the network address to one or more devices. At a second place 310B and time 330B, a second network node 130B may allocate the network address to one or more devices. Each of these states may be treated as different states of the network address. The determination of states may account for network addresses that tend to be assigned in different places at different times (e.g., in the metropolitan Boston area during the month of July, but elsewhere during other months), defining states based on spatiotemporal regions.

In addition to spatiotemporal regions, states may be defined based on a wide variety of other types of modes of operation or allocations. For example, states may represent one or more spatial regions (e.g., assignment in the city of New York) or one or more time intervals (e.g., weekend mornings, hours of the week, etc.). States may represent one or more users or device populations (e.g., Apple iPad® tablet computer users in the greater New Your city area). States may represent use with one or more network nodes 120 (e.g., a particular WiFi access point, identified by MAC address and/or SSID), or use with a particular network 130 (e.g., San Francisco municipal WiFi). Additionally, states may represent use of a communication standard (e.g., use of UTMS cellular), presence at a venue or POI (e.g., a single coffee shop), a class of venues or POIs (e.g., a set of coffee shops), as well as other properties.

A variety of clustering techniques, details of which are provided below, may be used to group network address observations into these sorts of states. Further, the clustering techniques may be used to determine one or more distinct times at which a network address transitions between states, to derive useful patterns. For example, it may be useful to determine a time where observations before the time are associated with a first network, and observations after the time are associated with a second network. Knowing such time may allow new observations to be easily sorted into states.

b. Clustering

In another technique, the processing software module 250 may determine clusters (i.e., groups) of network address observations (e.g., to form states) or of network addresses (e.g., to form network address groups). Clustering may be advantageous in a verity of circumstances, enabling the generation of attributes that would be impossible or unreliable to derive from individual observations or disjointed observations.

Figure 10B:
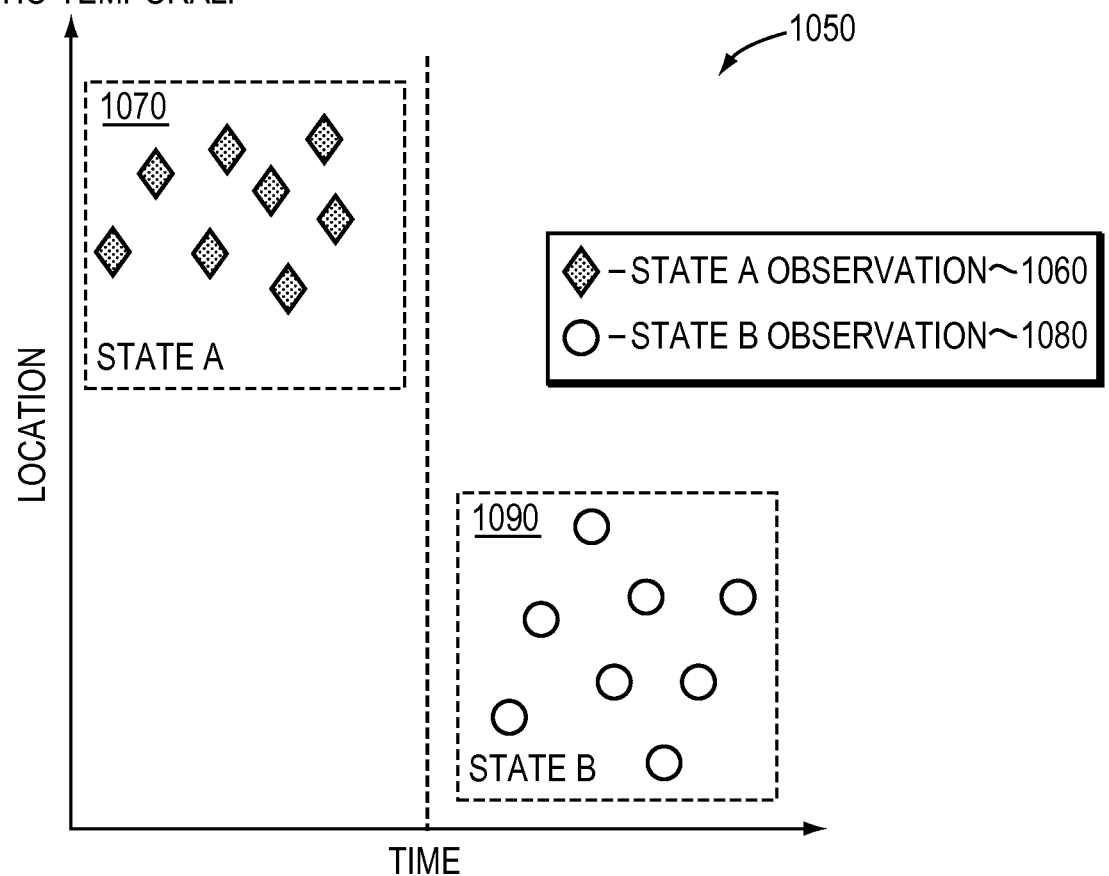
FIG. 10B is a diagram showing an example of determining groups of observations associated with discrete states of a network address.

Clustering techniques may be used to define the above discussed states of a network address based on a clustering criteria. Returning to the example of the clustering criteria being spatiotemporal properties, FIG. 10B is a diagram 1050 showing an example of determining groups of observations associated with discrete states of a network address. A first set of observations 1060 is clustered based on common spatiotemporal properties to form a first group 1070 representing a first state. A second set of observations 1080 is clustered to form a second group 1090 representing a second state. The processing software module 250 may utilize connected graph clustering, k-means clustering, binary classification or other techniques to cluster observations.

Likewise, clustering techniques may be used to define network address groups. A first set of network addresses, based on a clustering criteria, may be clustered to form a first group, while a second set of network addresses is clustered to form a second group. The processing software module 250 may utilize connected graph clustering, k-means clustering, binary classification or other techniques to cluster network addresses, applying various clustering criteria.

Below is a discussion of several example clustering criteria, and examples of their application by clustering techniques. While each specific example may cluster observations into states, or network addresses into network address groups, it should be understood that the criteria and clustering techniques may often be applicable to both types of clustering, with appropriate adaptations.

Figure 11:
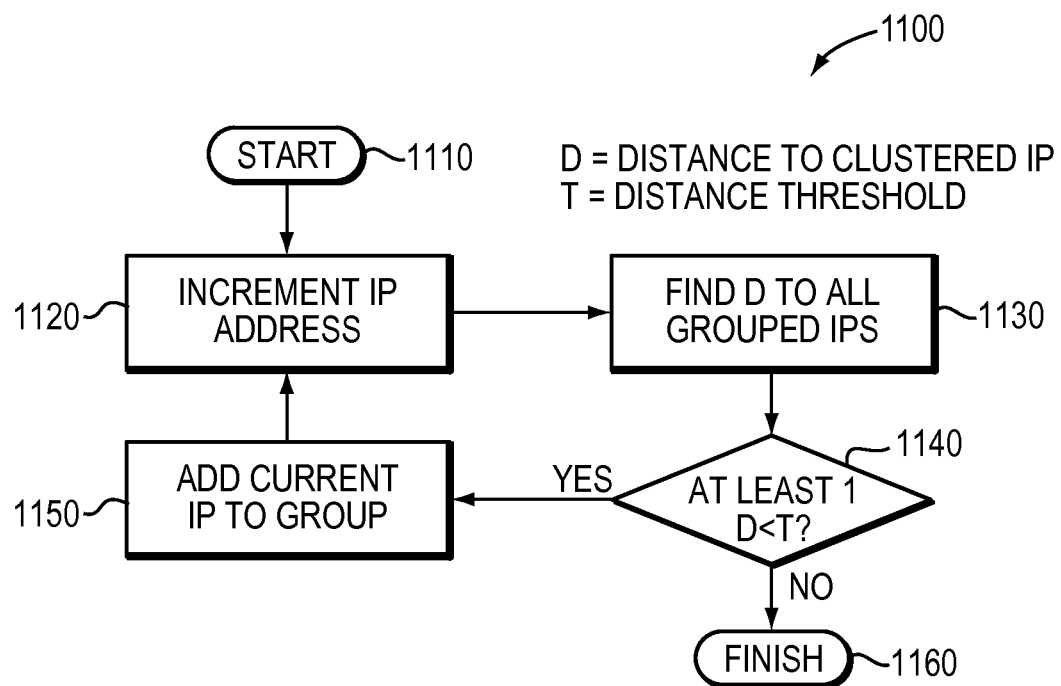
FIG. 11 is a flow diagram of an example sequence of steps for using connected graph clustering to divide an address space into contiguous blocks of spatially proximate network addresses.

One clustering criteria that may be utilized is common allocation or assignment of network addresses. Common allocation or assignment may be based on membership in a block of contiguous network address (e.g., network addresses adjacent in an address space), the size of which may be predetermined, or chosen based on some criteria (e.g., spatial proximity). For instance, a predetermined block size may be selected (e.g., 512 network addresses). Then, an address space may be divided into disjoint, contiguous blocks of network addresses of that block size. Alternatively, disjoint, contiguous blocks of network addresses may be produced by dividing the address space at points chosen based on some criteria (e.g., spatial proximity). FIG. 11 is a flow diagram of an example sequence of steps 1100 for using connected graph clustering to divide an address space into contiguous blocks of spatially proximate network addresses. At step 1110, the processing software module 250 starts at a given network address. At step 1120, an adjacent network address is determined. At step 1130, a separation distance is determined between an estimated location of the given network address and an estimated location of the adjacent network address. At step 1140, a determination is made whether the separation distance falls below a predetermined threshold. If so, at step 1150, a block of network addresses is extended to include the adjacent network address. If not, execution ends at step 1160. The sequence of steps 1100 continues to add adjacent network addresses to the block provided that they are sufficiently spatially proximate such that the separation distance falls below the predetermined threshold.

Figure 12:
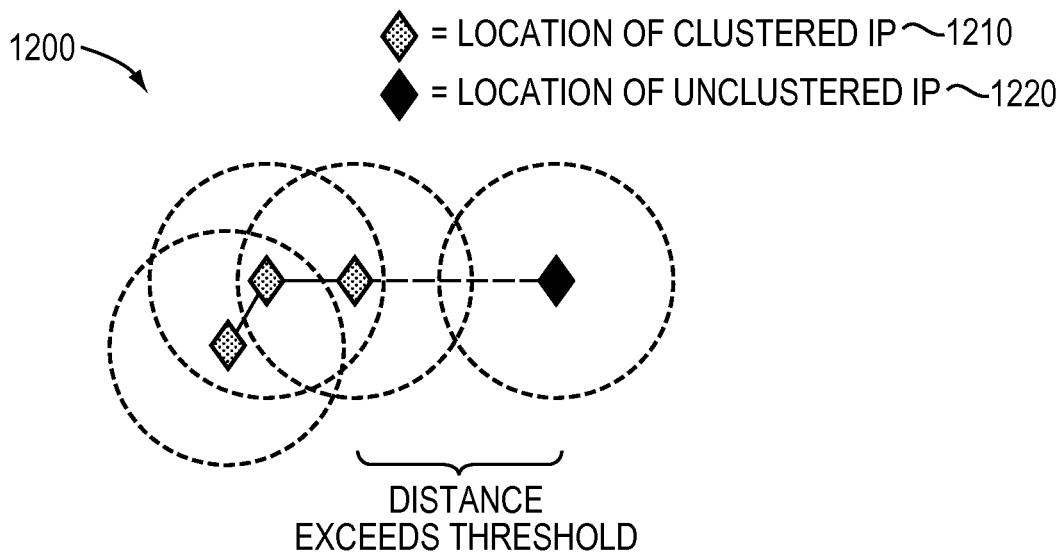
FIG. 12 is a diagram depicting an example of connected graph clustering of network addresses based on spatial proximity.

Another clustering criteria that may be utilized is common location or region, such that clustering is based on spatial proximity. The processing software module 250 may use connected graph clustering, similar to as discussed above in connection with contiguous blocks of network addresses, however removing the limitation that network addresses need to be contiguous. FIG. 12 is a diagram 1200 depicting an example of connected graph clustering of network addresses based on spatial proximity. Each network address is associated with an estimated location. Network addresses 1010 whose estimated locations have a separation distance that falls below a predetermined threshold are shown grouped together, while network addresses 1210 whose estimated locations have a separation distance that exceeds the predetermined threshold are excluded from the group.

Figure 13:
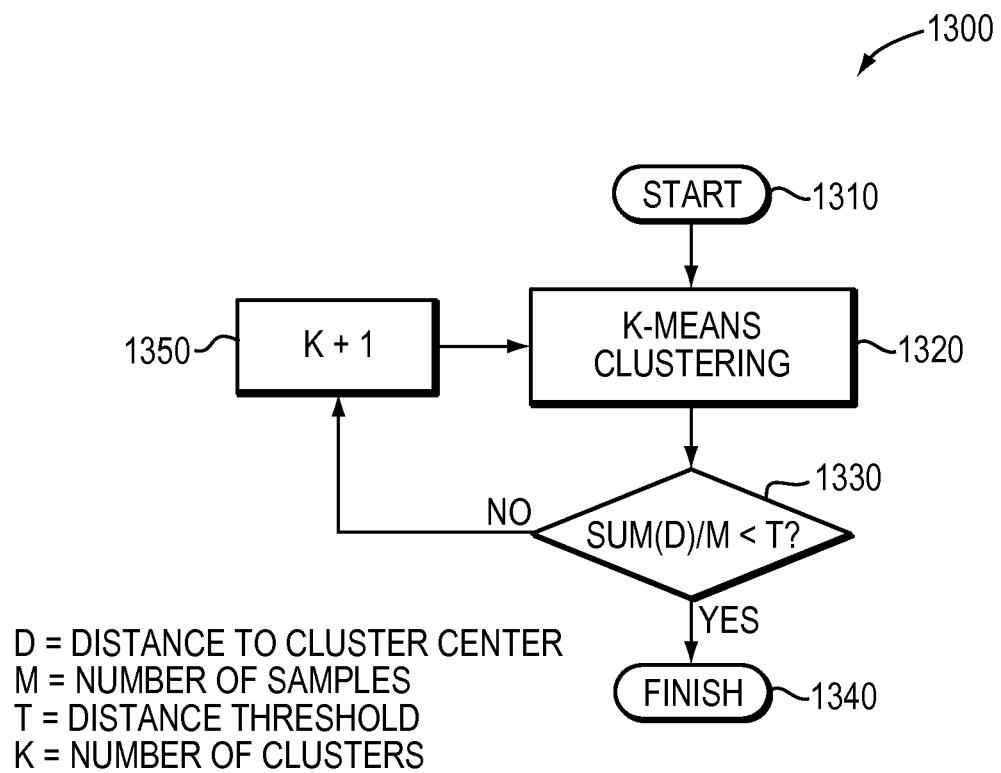
FIG. 13 is a flow diagram of an example sequence of steps for using k-means clustering based on spatial proximity.

Alternatively, k-means clustering or another clustering technique may be utilized to cluster based on spatial proximity. FIG. 13 is a flow diagram of an example sequence of steps 1300 for using k-means clustering based on spatial proximity. The sequence begins at step 1310, where a variable, k, that represents a number of clusters, is initialized to 1. At step 1320, k-means clustering operations are performed, including determining a mean location (i.e. a cluster center) and a distance from each sample to the cluster center. At step 1330, a mean distance is determined from each sample to the cluster center, and the mean distance is compared to a distance threshold. If the mean distance is less than the distance threshold, execution proceeds to step 1340, where the sequence finishes yielding a number of clusters equal to K. Otherwise, execution proceeds to step 1350, where K is incremented and the sequence is repeated.

Another clustering criteria that may be utilized is a common time, such that clustering is based on temporal proximity. For example, separate groups may be created that each correspond to one or more time intervals (e.g., days, hours of the week, etc.). A separate group may be formed for each time interval in which there is at least one observation.

Figure 14:
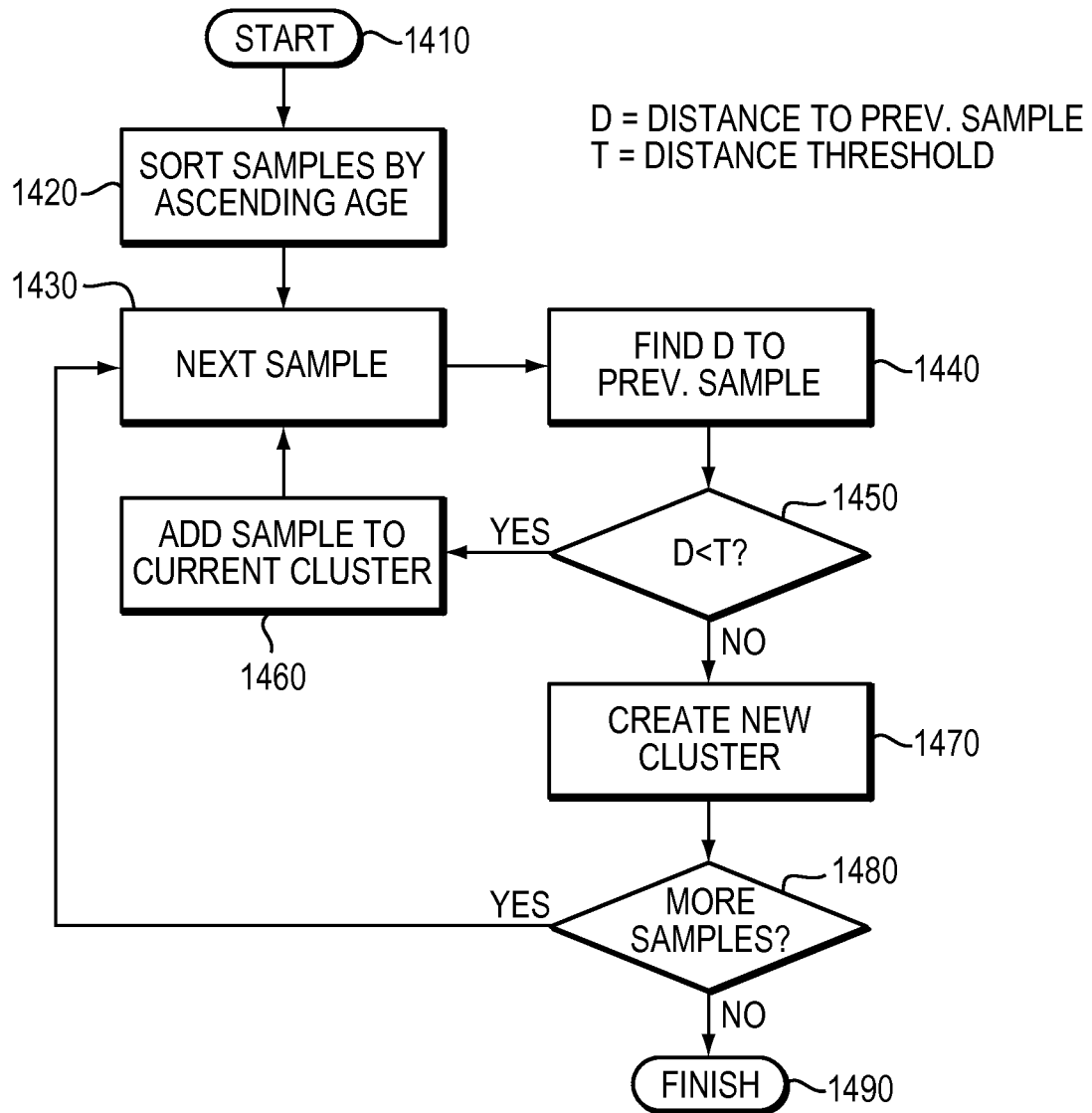
FIG. 14 is a flow diagram of an example sequence of steps for using connected graph clustering to form groups based on spatiotemporal properties.

Another clustering criteria that may be utilized is common spatiotemporal properties, such that clustering is based on spatiotemporal relations. Such technique may have particular applications to distinguishing the presence of distinct states such as when a network address appears in one location, then moves to a second location, and then returns to the first location. The processing software module 250 may utilize connected graph clustering, among other techniques, to cluster based on spatiotemporal properties. FIG. 14 is a flow diagram of an example sequence of steps 1400 for using connected graph clustering to form groups based on spatiotemporal properties. The sequence starts at step 1410, and proceeds to step 1420, where samples (e.g., observations of a network address) are sorted in an ascending order by age, and a newest sample is selected as an initial sample. At step 1430, a next sample by age (in this iteration, the second-newest sample) is selected. At step 1440, a distance between the initial sample and the next sample is determined. At step 1450, the distance is compared to a predetermined threshold distance. If the distance is below the threshold, the two samples are considered to be a part of the same cluster, and execution proceeds to step 1460, where the next sample is added to a cluster of the initial sample. If the distance exceeds the threshold, then execution proceeds to step 1470, where the next sample is considered to be a member of a new cluster. At step 1480, it is determined if there are any additional samples to be tested, and, if so, the process is repeated, selecting a new next sample in the ascending order by age. After all samples have been considered, the sequence of steps ends at step 1480.

Another clustering criteria that may be utilized is common user or device properties. User or device properties may take the form of association with a common user or device population (e.g., being associated with tablet computer users), association with a common network node 120 (e.g., a given cellular base station), association with a common network 130 (e.g., network addresses associated with San Francisco municipal service providers), among other possibilities.

Still other clustering criteria that may be utilized include association with a common service providers (e.g., cellular service providers offering prepaid plans), association with a common communications standards (e.g., high bandwidth Long-Term Evolution (LTE) cellular communications standards), association with common venues or POIs, among other possibilities.

c. Positioning

In another technique, the processing software module 250 may utilize multiple observations to estimate locations. Observations of a single network address may be used to determine an estimated location of the single network address. For example, observations of the single network address may be clustered, and an estimated location determined from one or more of these groups. Alternatively, observations for network addresses that are members of a group of network addresses may used to determine an estimated location, that is then attributed to the group as a whole or to individual network addresses that are members of the group. For example, observations in the group may be assembled, and treated as a single observation set. A statistical technique may be applied to the single observation set and one or more locations estimated. In still other alternatives, locations of one or more individual network addresses that are members of a group may be estimated individually from observations, and used to determine an estimated location, that is then attributed to the group as a whole or to individual network addresses that are members of the group. For example, statistical techniques may be applied to estimated locations of individual network addresses rather than the observations themselves. The one or more locations produced from these statistical techniques may then be used. A variety of other alternatives may also be implemented.

In the case that observations of a single network address are used to determine an estimated location of the single network address, various statistical techniques may be applied to generate one or more estimated locations. These statistical techniques may utilize various ones of the clustering techniques discussed above. For example, the processing software module 250 may perform spatiotemporal connected graph clustering on observations of a network address. Thereafter, a determination may be made of an age of a newest observation in each cluster. The cluster having the newest observation may be selected as representing a current state of the network address. Then, the processing software module 250 may compute a median location of the observations in the selected cluster, and associate the median location with the network address. Alternatively, the processing software module 250 may perform spatial connected graph clustering on observations of a network address. For each cluster, a median location of the observations may be computed in that cluster. For each median location, an association between the network address and the median location may be generated, such that the network address is considered observable at each of the locations. A variety of other alternatives may also be used.

In the case that observations for network addresses that are members of the group are used to construct a single observation set, various statistical techniques may be applied to generate one or more estimated locations. These statistical techniques may utilize various ones of the clustering techniques discussed above or other techniques. For example, the processing software module 250 may aggregate observations of network addresses in a group of network addresses formed through clustering. Two predetermined percentile values (referred to herein as "fences") may be determined for components of the location (e.g., longitude and latitude coordinates of the location). The fences may operate as upper and lower limits (e.g., at a $5^{th}$ and $95^{th}$ percentile values), and a mean location may be computed based on observations that fall between those limits.

In the case that locations of one or more individual network addresses that are members of a group are estimated individually from observations, and used to determine an estimated location, various statistical techniques may again be applied. For example, the processing software module 250 may estimate locations individually for each network address that is a member of the group. A median location may be computed across all the locations. This median location may be associated with the group. Alternatively, the processing software module 250 may estimate locations individually for each network address that is a member of the group. Then, for each network address of the group, a mean-squared distance (MSD) between observations of that network address and the estimated location of that network address is calculated. A weight is computed for each network address of the group, where each weight is inversely proportional to the MSD of the corresponding network address. The weights are used to compute a weighted average of the locations of the network addresses in the group. In still other alternatives, derived characteristics of estimated locations of members of the group may be used. Such characteristics may enable functionality, such as group venue locking. For example, the processing software module 250 may estimate locations individually for each network address that is a member of the group. A set of one or more spatial polygons representing venue footprints are assembled. The network address locations are compared against the venue footprints to determine how many network address locations intersect each venue polygon. For each venue, a fraction of network addresses in the group that intersect the venue polygon is determined. If any venues have a fraction exceeding a predetermined threshold (e.g., 0.1), those venues are associated with the group.

It should be understood that a wide variety of other positioning techniques may be alternatively employed.

d. Classification.

In another technique, the processing software module 250 may classify one or more network addresses as belonging to one or more classifications (i.e., a set of network addresses that have a particular attribute association) based on a classification criteria. Classification may take a number of different forms. Individual network address that have yet to be classified or require reclassification (herein "new network addresses") may be classified as belonging to one or more classifications. Likewise groups of network address that have yet to be classified or require reclassification (herein "groups of new network addresses") may be classified as belonging to one or more classifications.

In one case, the processing software module 250 may classify an individual network address as belonging to a classification based on a measure of likelihood that the individual network address belongs to the classification. For example, the processing software module 250 may determine the probability that an individual network address is associated with a particular WiFi network. To make such determination, the processing software module 250 may gather observations of the individual network address, and compute a total number of the observations. A fraction of the observations associated with a WiFi access point is computed. A confidence interval about the computed fraction is then calculated as a function of the total number of observations, for example, using the formula:

$$e = Q^{-1}\left(\frac{a}{2}\right)\sqrt{\frac{f(1-f)}{M}}$$

where f is the fraction, e is half the width of the confidence interval, a is a tolerance interval (e.g. 0.05), M is the number of observations, and Q is the Gaussian tail integral. A value of the fraction minus half of the width of the confidence interval (f−e) represents the probability that the individual network address is associated with the WiFi network.

Further, a binary decision that an individual network address belongs to a classification may be made. The binary decision may be made based on a calculated measure of likelihood that the individual network address belongs to the classification, or directly made in some other manner. For instance, returning to the previously discussed example of where the probability is of an individual network address being associated with a particular WiFi network, the processing software module 250 may compare the probability to a predetermined threshold (e.g., 0.7), and classify the network address as belonging to the WiFi network if the probability exceeds the predetermined threshold.

Alternatively, the processing software module 250 may determine an individual network address cannot be classified with sufficient accuracy to make a binary decision. For instance, the measure of likelihood that the individual network address belongs to the classification may be compared to one or more thresholds, and depending on the relation to those thresholds, the processing software module 250 may determine that it cannot conclusively indicate that the individual network address is either a member, or not a member, of the classification.

In another case, the processing software module 250 may determine a measure of likelihood that a group of network addresses belongs to a classification. The measure of likelihood that the group of network addresses belongs to the classification may be calculated in a variety of different manners.

For example, the measure of likelihood that the group of network addresses belongs to the classification may be calculated from measures of likelihood that individual network addresses of the group of network addresses belong to the classification (e.g., using a combination of individual measures of likelihood as representative of a measure of likelihood for the group). In one instance, the processing software module 250 may classify a group of network addresses as belonging to a classification representing a venue class, by determining a posterior probability for each network address that the number of observations of that network address would occur given that the individual network address is associated with the venue class. A median of the posterior probabilities is determined across the network addresses in the group of network addresses. The median is associated with the group of network addresses as a measure of likelihood that the group is associated with the given venue class.

Likewise, the measure of likelihood that the group of network addresses belongs to the classification may be calculated based on binary decisions whether individual network addresses belong to the classification (e.g., determining a fraction of individual network addresses determined to belong to the classification). For instance, to determine whether a group of network addresses is to be classified as proxy addresses, a determination may be made whether each individual network address in the group is classified as belonging to a proxy device. A fraction of the network addresses classified as belonging to proxy devices is used as a probability that the group of network addresses is made up entirely of network addresses belonging to proxy devices.

Further, a binary decision that the group of network addresses belongs to the classification may be made. The binary decision may be made based on a calculated measure of likelihood that the group of network addresses belongs to the classification, or directly made in some other manner.

For example, a binary decision that the group of network addresses belongs to the classification may be made based on measures of likelihood that individual network addresses belong to the classification (e.g., determining whether a predetermined fraction of individual measures of likelihood exceeds a predetermined threshold). For instance, to determine whether a group of network addresses is to be classified as proxy addresses, a measure of likelihood may be calculated whether each individual network address in the group belongs to a proxy device. For each individual network address, the measure of likelihood may be compared against a predetermined threshold. A fraction of individual network addresses in the group having measures of likelihood that exceed the threshold is determined. This fraction is compared to a second predetermined threshold, and if the fraction exceeds the second predetermined threshold, the group of network addresses is classified as proxy addresses.

Likewise, a binary decision that the group of network addresses belongs to the classification may be made based on binary decisions that individual network addresses belong to the classification (e.g., determining whether a fraction of individual classifications exceeds a predetermined threshold). For instance, to determine whether a group of network addresses is to be classified as proxy addresses, a determination may be made whether each individual network address in the group is classified as belonging to a proxy device. A fraction of the network addresses classified as belonging to proxy devices is calculated and compared to a predetermined threshold. If the fraction exceeds the threshold, the group of network addresses is classified as proxy addresses.

In still another case, the processing software module 250 may classify an individual network address as belonging to a classification based on a measure of likelihood that a group of network addresses belong to the classification (sometimes referred to as bootstrapped classification). The measure of likelihood that the group of network addresses belongs to the classification may be calculated in a variety of different manners.

For example, the processing software module 250 may determine a measure of likelihood that an individual network address belongs to a classification based on a measure of likelihood that a group of network addresses of which the individual network address is a member belongs to the classification (e.g., applying the group measure of likelihood to the individual network address as an individual measure of likelihood). In one instance, such technique may be used with an individual network address associated with a venue (e.g., a sports stadium) and the processing software module 250 may determine a group probability that a group of network addresses of which the individual network address is member is associated with the venue. Then, for each network address in the group, an individual probability is determined of being associated with the venue. For each network address, a weight is computed based on a number of observations of that network address. Then, for each network address in the group, a mixed probability is calculated by combining the individual probability and the group probability. The mixed probability is assigned to each network address as a measure of likelihood that the network address is associated with the venue.

Further, a binary decision that an individual network address belongs to the classification may be made. The binary decision may be made based on a calculated measure of likelihood that the group of network addresses belongs to the classification, or directly made in some other manner.

For example, a binary decision may be made that an individual network address belongs to the classification based on a measure that a group of network addresses of which the individual network address is a member belongs to the classification (e.g., determining whether the group measure of likelihood exceeds a predetermined threshold). For instance, to make a binary decision whether an individual network address is a proxy address, the processing software module 250 may determine a group probability that a group of network addresses belong to proxy devices, and compare the group probability to a first threshold. If the group probability exceeds the first threshold, all individual network addresses in the group may be declared to belong to proxy devices. Otherwise, the group probability may be compared to a second threshold that is less than the first threshold. If the group probability is less than the second threshold, all individual network addresses in the group may be declared to belong to non-proxy devices. If the group probability lies between the two thresholds, no declaration may be made one way or the other.

Likewise, a binary decision may be made that an individual network address belongs to a classification based on a binary decision whether a group of network addresses of which the individual network address is a member belongs to the classification (e.g., applying the binary classification of the group to the individual network address). For instance, to make a binary decision whether an individual network address is a proxy device, the processing software module 250 may determine whether a group of network addresses belong to proxy devices. The classifications of individual network addresses that are members of the group may be updated to match the classification of the group.

While classifications may represent sets of network addresses that have various different attribute associations, in one subcase, classifications may represent segments. As used herein, the term "segment" refers to a market group based on one or more demographic, activity, interest, behavior, or intent-based labels applied to groups of people. An example of a segment is sports fans, business travelers, white collar worker, college students, etc. Classification may be used to determine whether an individual network address is associated with a particular segment, using any of the technique described above, as well as further techniques specifically adapted to segments.

For example, a decision whether an individual network address is associated with a segment may be based on a measure of likelihood derived from that individual network address. For instance, to determine whether an individual network address is associated with a sports fan segment, the processing software module 250 may gather observations of that network address, gather a set of polygons associated with attending or watching sporting events (e.g., about sports arenas, sports bars, etc.), and then determine what fraction of observations for the network address intersect the polygons. The fraction is used as a score indicating a strength of association between the network address and the segment of sports fans and can be compared against a predetermined threshold to make a binary determination of the association.

Likewise, a measure of likelihood that an individual network address is associated with a segment may be based on segments associated with individual observations of the network address. For instance, to determine a measure of likelihood that an individual network address is associated with a business traveler, the processing software module 250 may gather observations of that network address, determine a fraction of the observations associated with a set of users or devices identified as belonging to a business traveler segment, and compare the business traveler fraction against business traveler fractions of other network addresses. A percentile may be produced from this comparison and used as a measure of likelihood the network address is associated with the business traveler segment.

Further, a binary decision that an individual network address is associated with a segment may be based on segments associated with individual observations of the network address. For instance, to make a binary decision that an individual network address is associated with a business traveler segment, the processing software module 250 may gather observations of that network address, determine a fraction of the observations associated with a particular business traveler segment, and compare the fraction against a predetermined threshold. If the fraction exceeds the threshold, the network address may be declared to be associated with the business traveler segment.

It should be understood that a wide variety of other techniques may be employed by the processing software module 250 to classify network addresses.

e. Proxy Determination

In another technique, the processing software module 250 may determine whether a network address is a proxy or non-proxy network address (e.g., is likely assigned to an intermediary network device acting as a gateway between an end device and a destination device, thereby obscuring the identity of the end device, or assigned to the end device itself). The determination may be made based on a variety of factors, including spatial and temporal factors. The determination may be based on attributes or observations of the network address itself and/or of a group of network addresses in which the network address is a member, or statistical measures applied to attributes or observations of the network address itself and/or of a group of network addresses in which the network address is a member. For example, an individual network address may be determined to likely be associated with a proxy device based on a determination that the network address belongs to a group of network addresses likely to include network addresses associated with one or more proxy devices. Alternatively, a group of network addresses may be determined to likely be associated with proxy devices based on a determination that an individual network address that is a member of the group is likely associated with a proxy device. The processing software module 250 may make these types of determinations in a variety of different ways.

For example, the processing software module 250 may look to spatial relationships among observations, for instance, calculating a root mean-squared (RMS) distance. Observations of a network address may be gathered and a distance from each observation to an estimated location of the network address calculated. An RMS distance between the observations and the estimated location is also computed. The RMS distance is compared against a predetermined threshold (e.g., 10,000 km). If the RMS distance exceeds the threshold, the network address is declared to belong to a proxy device. Otherwise the network address is declared to belong to a non-proxy device. The technique leverages the fact that proxy addresses will often mask large numbers of addresses that are spread over very large areas, so that, with proxy addresses, there generally will be very large distances between the estimated location of the network address and locations of individual observations of the network address.

Alternatively, the processing software module 250 may look to temporal relationships among observations, for instance, calculating an observation frequency. Observations of a network address are gathered and a duration that represents the difference between a maximum time and a minimum time of the observations is computed. An observation frequency is computed as the number of observations divided by the duration. If the observation frequency exceeds a threshold, the network address is declared to belong to a proxy device. The technique leverages the fact that proxy addresses will often mask large numbers of addresses, and that aggregating traffic of large numbers of individual network addresses can lead to high observation frequencies.

In still another alternative, the processing software module 250 may look to side-information, for example, from a third party data provider. The side-information may be based on an attribute of the network address, for example, related to venue, device identifier, network, or another type of attribute. For instance, in the case of venue, a set of venues associated with the network address may be gathered. This set of venues is cross-referenced against side-information regarding the use of proxy devices at entities connected with the venues in the set. If venues in the set are believed to use proxy devices, then the network address is declared to belong to a proxy device. This technique leverages information not tied directly to the network address, and forming an association with that information based on associations between network addresses and other attributes.

In yet other alternatives, the processing software module 250 may look to network information, such as network count, a communication standards mismatch, or number of countries associated with network nodes. For instance, in the case of network count, a list of networks associated with a network address may be constructed. The number of unique networks in the list is compared against a predetermined threshold. The predetermined threshold may be based on an empirical probability distribution. If the number of networks exceeds the threshold, then the network address is declared to belong to a proxy device. This technique leverages the fact that network addresses assigned to non-proxy devices are typically only associated with a small number of networks, but that network addresses assigned to proxy devices may be associated with a potentially unlimited number of networks.

In still other alternatives, the processing software module 250 may look to factors such as observation periodicity, observation velocity, number of distinct users, number of nationalities, or a variety of other factors to determine whether one or more network addresses are likely assigned to proxy devices.

f. Fixed/Mobile Determination

In another technique, the processing software module 250 may determine whether a network address is likely to be fixed to a particular location or mobile among different locations (e.g., assigned to one or more mobile devices that regularly move between multiple networks 130, or are in communication with multiple different network nodes 120, while still maintaining a same network address, or assigned to one or more fixed device that generally do not move between networks while maintaining a same network address). The determination may be made based on a variety of factors, including spatial and temporal factors. The determination may be based on attributes or observations of the network address itself and/or of a group of network addresses in which the network address is a member, or statistical measures applied to attributes or observations of the network address itself and/or of a group of network addresses in which the network address is a member. For example, the determination may be made based on whether observed attributes associated with the network address indicate the network address is a mobile network address. Alternatively, the determination may be made based on whether other network addresses of a group of network addresses to which the network address belongs are likely to be mobile network addresses. In still other alternatives, the determination may be made based on whether a group of network addresses to which the network address belongs is likely to contain one or more mobile network addresses. The processing software module 250 may make these types of determination in a variety of different ways.

For example, the processing software module 250 may make the determination based on one or more communication standards, networks 130, and/or network nodes 120 associated with the network address. A list of communication standards, networks, and/or network nodes associated with the network address may be gathered. Then, for example, if the list contains a network that only support cellular communications, a cellular communication standard, or a cellular communication network node, the network address is declared a mobile network address.

Alternatively, the processing software module 250 may make the determination based on a per-device spatial extent. Observations of the network address may be gathered and grouped according to user identifiers. For each group, a spatial extent is calculated that is, for example, equal to the length of a diagonal of a minimum bounding rectangle containing all the observations in the group. For each group of observations, the spatial extent is compared against a predetermined threshold (e.g., 1 kilometer), where the threshold may exceed the coverage associated with non-mobile network addresses. If any of the spatial extent values exceed the threshold, then the network address may be declared a mobile network address.

In still another alternative, the processing software module 250 may make the determination based on a time-windowed extent. Observations of the network address that were collected within a predetermined time window (e.g., 1 day) may be gathered. A spatial extent of the observations in the time window is calculated, for example, to equal a mean-squared distance from the mean location of the observations to individual observation locations. The spatial extent value is compared against a predetermined threshold (e.g., 2 km). If the spatial extent value exceeds the threshold, then the network address may be declared a mobile network address.

g. Stable/Unstable Determination

In another technique, the processing software module 250 may determine whether a network address is likely to remain in a single state for a particular interval of time (i.e. is a stable network address), or likely to not remain in a single state (i.e. is an unstable network address). The determination may be made based on a variety of factors. For example, the determination may be made based on whether observed attributes associated with the network address indicate the network address is stable or unstable. Alternatively, the determination may be made based on whether other network addresses of a group of network addresses to which the network address belongs are likely to be stable or unstable. In still other alternatives, the determination may be made based on whether a group of network addresses to which the network address belongs is likely to contain one or more stable or unstable network addresses. The processing software module 250 may make these types of determination in a variety of different ways.

For example, the processing software module 250 may make the determination based on a cluster duration. Observations of a network address may be gathered and spatiotemporal connected graph clustering applied to form groups. For each group, a duration equal to a time difference between an oldest and a newest observation in the group is computed. A median duration across all groups is determined, and this median duration is used as a measure of stability of the network address, with a higher median duration indicating a more stable network address.

Alternatively, the processing software module 250 may make the determination based on a venue duration. Observations of a network address may be gathered and clustered to form groups associated with venues. For each group, a duration equal to the time difference between an oldest and a newest observation in the group is computed. A median duration across all groups is determined, and this median duration is used as a measure of stability of the network address.

In still another alternative, the processing software module 250 may make the determination based on an association with a network node. Observations of a network address may be gathered and match-temporal connected graph clustering (i.e. a technique combining Boolean attribute matching with temporal graph clustering) applied, using identifiers of network nodes as match characteristics. For each group formed, a duration equal to the time difference between an oldest an a newest observation in the group is computed. Using the duration values, a certain percentile duration (e.g., the $67^{th}$ percentile) is selected to use as a measure of stability of the network address, with a higher duration indicating a more stable network address. This technique leverages the fact that stable network addresses tend to remain associated with a single network node for relatively longer durations than unstable network addresses.

h. Other Types of Refined Attribute Determinations

In addition to determination of the above discussed types of attributes, it should be understood that the processing software module 250 may derive a variety of other types of attributes, which may be stored as refined attributes in a profile. Deriving such attributes may involve a variety of types of determinations, including: determining a measure of likelihood (or making a binary decision) that one or more network addresses are associated with a selected network, determining a measure of likelihood (or making a binary decision) that one or more network addresses are associated with a selected network node, determining a measure of likelihood (or making a binary decision) that one or more network addresses are associated with a spatial region, determining a measure of likelihood (or making a binary decision) that one or more network addresses are associated with a user or device, determining a measure of likelihood (or making a binary decision) that one or more network addresses are associated with a user or device population, determining a measure of likelihood (or making a binary decision) that one or more network addresses are associated with a venue or POI or a venue or POI class, determining a measure of likelihood (or making a binary decision) that one or more network addresses are associated with a network address group, and/or determining a measure of likelihood (or making a binary decision) that one or more network addresses are associated with some other type of attribute.

i. Characterization.

In another technique, the processing software module 250 may characterize an association between a network address and one or more attributes. The processing software module 250 may gather network address observations used to produce the association between the network address and the one or more attributes. The network address observations may be of the network address itself, or for a group of network addresses to which the network address belongs. Based on the gathered network address observations, the processing software module 250 may (e.g., by applying statistical techniques) generate a parameter characterizing the association between the network address and the one or more attributes, the parameter providing some measure of reliability or correctness of the association. The parameter may take a number of different forms.

Figure 15:
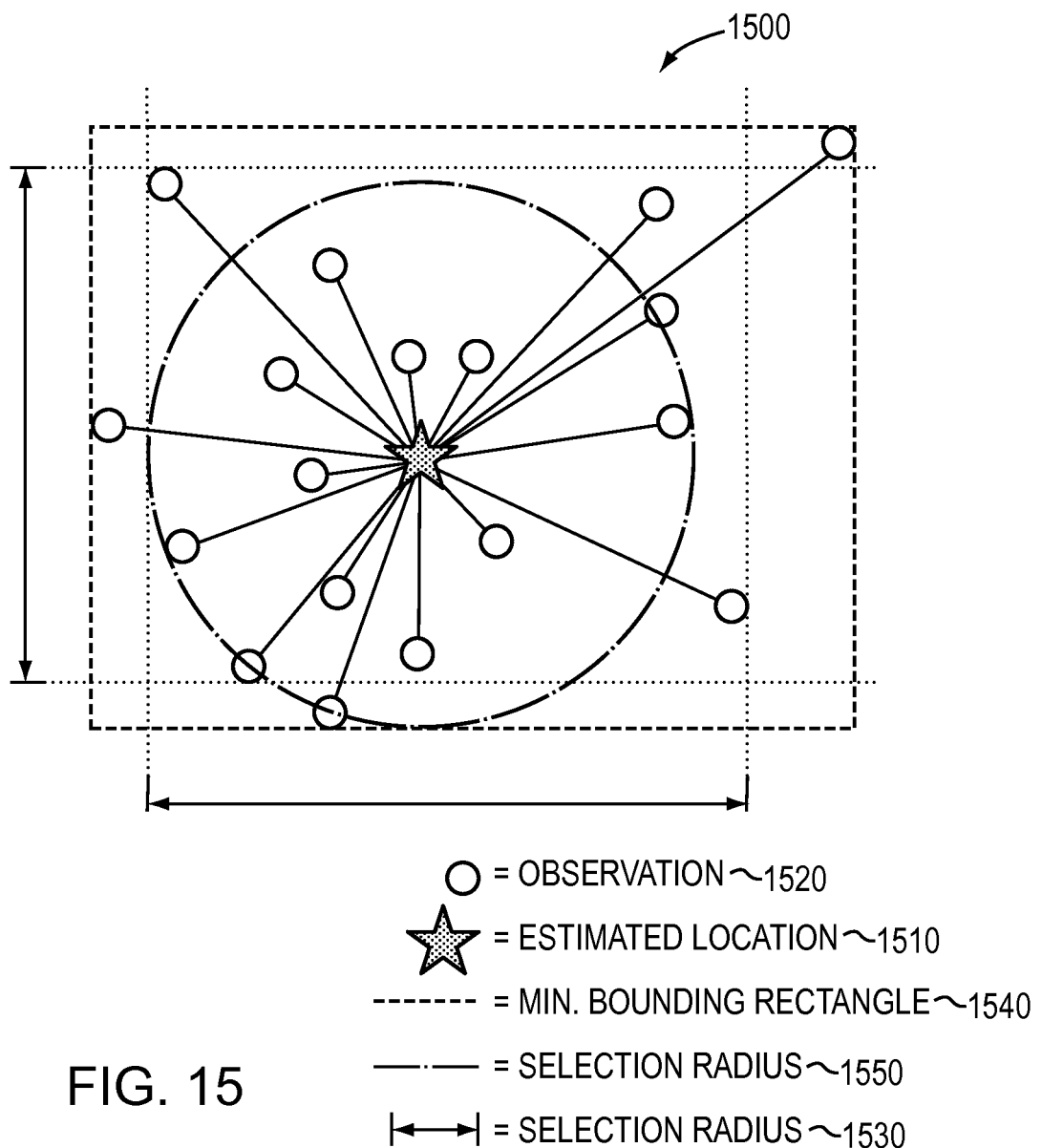
FIG. 15 is a diagram illustrating an example of determining a spatial extent.

In one case, the parameter may indicate a spatial extent, such that characterization determines a size of a spatial region over which the network address may be located. The size of the region may provide a measure of how likely a source device associated with the network address is locate substantially at the estimated location itself, or is instead located some distance away. FIG. 15 is a diagram illustrating an example of determining a spatial extent. An estimated location 1510 of a network address may be calculated by the processing software module 250 from observations of the network address 1520, using the techniques discussed above. The processing software module 250 may now apply one or more statistical techniques to the observations to determine a spatial extent about that estimated location. For example, the processing software module 250 may calculate coordinate percentiles 1530 that include a middle portion (e.g., 90%) of the observations. Lower (e.g., 5%) and upper (e.g., 95%) percentile limits are calculated for components (e.g., latitude and longitude) of the location of each observation. The distances between the percentile limits are used as a measure of the spatial extent. Alternatively, the processing software module 250 may calculate a minimum bounding rectangle (MBR) 1540 containing all of the observations. A measure of the MBR (e.g., its area, length of a diagonal, etc.) is used to define the spatial extent. In still another alternative, statistics of observations falling within a selection radius 1550 of the estimated location 1510 may be used. A fraction of observations falling within the selection radius 1550 of the estimated location 1510 is calculated. This fraction is used as a measure of the spatial extent.

In another case, the parameter may indicate an association confidence. The association confidence may measure the likelihood that one or more attributes associated with the network address are valid. Alternatively, the association confidence may measure the likelihood that the one or more attributes associated with the network address will be present in one or more subsequent observations. The attribute may be a location or region, a venue or POI, a user or device identifier, a group of users or devices, a network, a network node, a communication standard, or some other type of attribute. The processing software module 250 applies one or more statistical techniques to the observations to determine association confidence.

For example, the processing software module 250 may calculate a radius fraction. A fraction of observations of the network address that are within a prescribed radius of the estimated location of the network address may be calculated. A confidence interval is calculated as a function of the fraction and a total number observations. The confidence interval is subtracted from the fraction, to produce an estimate of the probability that the network address will be observed within the prescribed radius of the estimated location.

Alternatively, the processing software module 250 may calculate a radius duration. For instance, to determine a confidence that the network address will be observed within the prescribed radius, a set of observations of the network address may be selected that are within a prescribed radius of the estimated location of the network address. A temporal duration spanned by the set of observations is computed. The temporal duration is used as a measure of confidence that the network address will be observed within the prescribed radius. This technique leverages the fact that network addresses that have remained observable within a limited distance of their estimated location are more likely to remain observable within that limited distance in the future.

In still another alternative, the processing software module 250 may calculate an observation intensity. For instance, to determine confidence that a network address is associated with a user, a network address and a user may be selected. Observations of the network address are gathered. The observations are grouped into regular, disjoint, contiguous intervals (e.g., days). Using the set of intervals between a first and last observation in the interval, an average number of observation per interval is computed. The average number of observations is the maximum likelihood estimate of the Poisson observation intensity. The intensity is then used as a measure of confidence that the network address is associated with the user. This technique leverages the fact that network addresses that have remained observable within a limited distance of their estimated location are more likely to remain observable within that radius in the future.

In still another alternative, the processing software module 250 may calculate an empirical lift. For instance, to determine confidence in an association between a network address and a user group, observations of the network address may be gathered, and a group of users to analyze is selected. A fraction (i.e., an "observation fraction") of the observations that are associated with the user group is calculated. A fraction (i.e., a "population fraction") of the users in the user group relative to the entire population of users is calculated. An empirical lift is calculated by dividing the observed fraction by the population fraction, and this empirical lift is then used as a measure of confidence in the association between the network address and the user group. This technique may have use in ascertaining the significance of a network address in identifying a particular associated group.

In another case, the parameter may indicate a positioning error. The positioning error may measure an expected distance between an estimate location of a network address and one or more subsequent observations. Alternatively, the positioning error may measure a likelihood that one or more subsequent observations will fall within a predefined distance from the estimated location of the network address. In still another alternative, the positioning error may measure likelihood that one or more attributes associated with the network address will be present in one or more subsequent observations. In still another alternative, the positioning error may measure a percentile of the distances between an estimated location of a network address and a set of observations of the network address. The set of observations may include all available observations of the network address, observations of the network address excluding one or more observations deemed to be unreliable, observations of the network address excluding one or more observations deemed to be outliers, observations of the network address from within a particular time interval, observations of the network address used to compute the estimated location of a network address, observations of the network address associated with a particular group as a result of clustering, or some set of observations. The processing software module 250 may apply one or more statistical techniques to the observations to determine positioning error. These statistical techniques may vary based on the type of positioning error being calculated, and other factors.

For example, the processing software module 250 may calculate a mean-squared distance (MSD). The estimated location of the network address and a set of observations used to compute the estimated location may be retrieved. A MSD is computed using the distances from each of the observations of the set to the estimated location of the network address. A given percentile (e.g., the $95^{th}$ percentile) distance is estimated by multiplying the MSD by a factor (e.g., 2). The percentile distance is used as an estimate of the positioning error.

Alternatively, the processing software module 250 may calculate a fixed radius confidence. The estimated location of the network address and a set of observations used to compute the estimated location may be retrieved. A fraction of observations lying within a predetermined distance (i.e. a radius) of the estimated location is determined. A confidence interval about the computed fraction is then calculated as a function of the total number of observations, using techniques similar to those discussed above in other examples. A value of the fraction, minus half of the width of the confidence interval, is used as an estimate of the positioning error, or more specifically of the likelihood that the network address is located within the radius of the estimated location of the network address.

In still another alternative, the processing software module 250 may calculate a percentile radius. The estimated location of the network address and the set of observations used to compute the estimated location may be retrieved. A distance from each observation to the estimated location is calculated, and these distances sorted in ascending order. A value, D, is calculated, for example, by the formula:

$$J=\min(M\lfloor MP+Q^{-1}(A)\sqrt{MP(1-P)}\rfloor)$$

where D equal to $d_J$ which is the $J^{th}$ sorted distance value in the ascending order, P is a predetermined percentile, A is an error tolerance, M is the number of observation and Q is a Gaussian tail integral. A value of D is used as an error estimate for the estimated location of the network address.

j. Processing Summary

Figure 16:
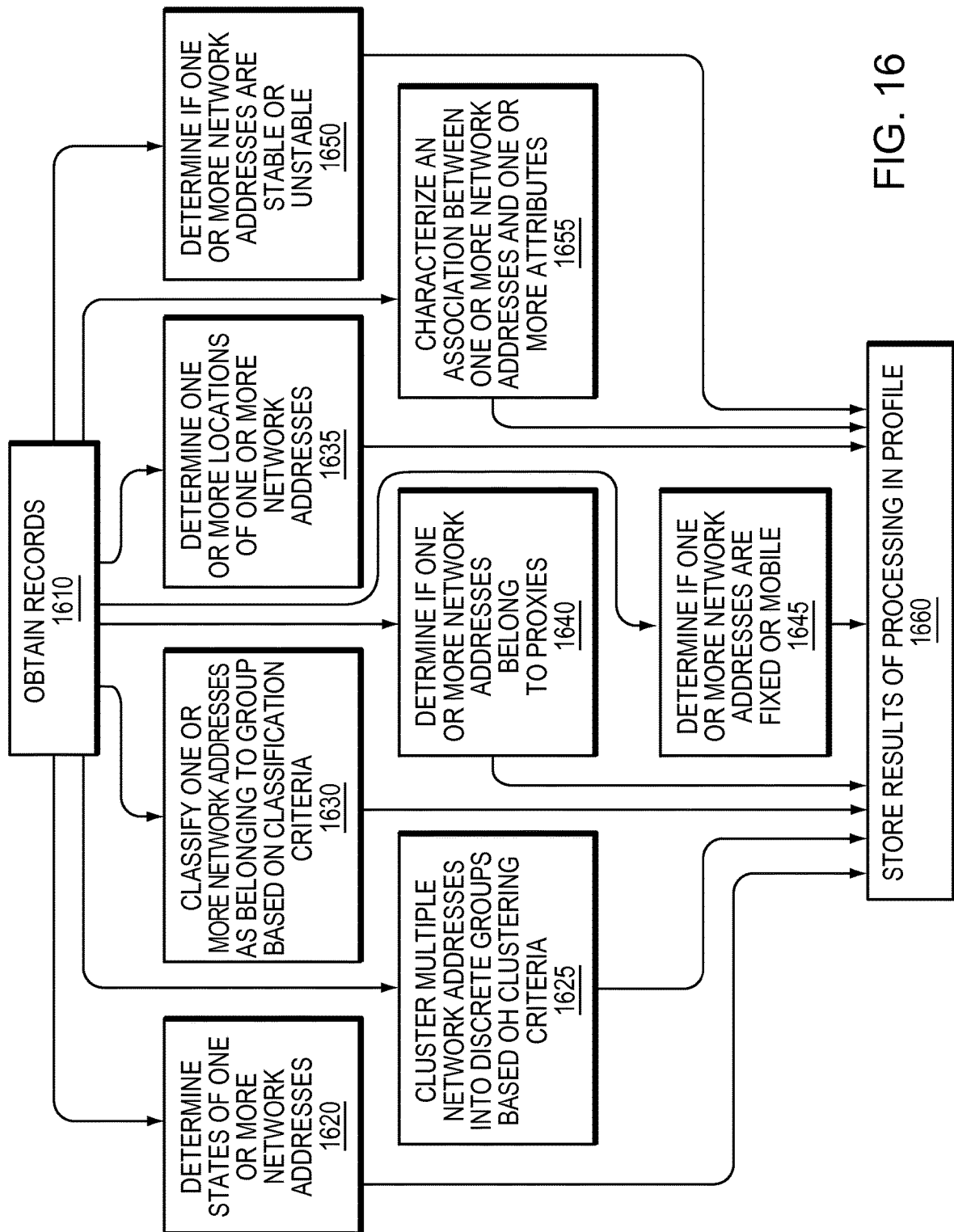
FIG. 16 is a flow diagram showing a generalized example sequence of steps that may summarize the operation of a processing software module.

To summarize, the processing software module 250 may derive more refined attributes using a wide variety of processing techniques, either alone, or in various combinations. Often these techniques use multiple observations (of a single network address or a group of network addresses) to draw insights that may not be apparent from any one individual observation. FIG. 16 is a flow diagram showing a generalized example sequence of steps 1600 that may summarize the operation of the processing software module 250. At step 1610, the processing software module 250 may obtain one or more records. At steps 1620-1655, one or more processing techniques may be applied to the observations and/or associations contained in those records. For example, at step 1620, the processing software module 250 may determine states of one or more network addresses, each state representing a distinct mode of operation or allocation of the one or more network addresses. At step 1625, the processing software module 250 may cluster multiple network addresses into one or more discrete groups, based on a clustering criteria. At step 1630, the processing software module 250 may classify one or more new network addresses as belonging to a group of network addresses, based on a classification criteria. At step 1635, the processing software module 250 may determine one or more estimated locations for one or more network addresses. At step 1640, the processing software module 250 may determine if one or more network addresses likely belong to intermediary devices, such as proxies. At step 1645, the processing software module 250 may determine whether one or more network addresses are likely fixed or mobile. At step 1650, the processing software module 250 may determine whether one or more network addresses are likely stable or unstable. At step 1655, the processing software module 250 may characterize an association between one or more network addresses and one or more attributes, generating a parameter descriptive of the association. Finally, after one or more of steps 1620-1655 that are executed, results of the processing may be stored in a profile maintained in a memory, at step 1660.

Propagation Software Module

The propagation software module 280 may propagate attributes associated with a first network address to be associated with at least a second network addresses determined to be sufficiently similar to the first network address, based on a similarity criteria. Propagation provides a mechanism for associating attributes with network addresses even when those attributes have not been observed in connection with those network addresses, or cannot be derived through processing of observations of those network addresses. In this manner, propagation allows for attribute associations to be made in cases where there is insufficient quantity of observations, insufficient number of devices generating observations, biases in the observation set, systematic restrictions on observability, or some other limitation.

Attribute propagation may involve establishing an explicit connection between a first network address and the second network address (e.g., the network addresses are explicitly declared to be related, explicitly included as members of a same group, or otherwise explicitly linked). Alternatively, propagation may be conducted indirectly, without establishing an explicit connection between the first network address and the second network address. For example, attributes may be propagated to be associated with one or more non-network address entities (e.g., users, locations or regions, venues or POIs, etc.), and the attributes of the non-network address entity later propagated to the second network address.

Attribute propagation may involve various types of transfer or sharing of the attributes. In addition to simply taking an attribute associated with a first network address and associating it unchanged with a second network address that does not already have a value for that attribute associated with it, an attribute may replace or be blended with pre-existing attributes of the second network address, attributes may be mutually blended across the first and second network addresses, attributes may be optimized across the first and second network addresses, or some other more advanced type of transfer or sharing of attributes conducted.

The similarity criteria employed in propagation may take a variety of different forms, such that the propagation software module 280 may conduct a variety of different types of attribute propagation. For example, the similarity criteria may be spatial proximity, such that the propagation software module 280 propagates attributes from a first network address to a second network address based on spatial proximity of an estimated location associated with the first network address and an estimated location of the second network address. The propagation software module 280 may calculate spatial proximity in various ways. For instance, the propagation software module 280 may utilize a spatial radius. A first network address and one or more attributes to propagate (e.g., an estimate of the income distribution of users of the network address) is selected. One or more other network addresses whose estimated location are within a predetermined radius (e.g., 1 km) of the first network address's estimated location are selected. The radius may depend on application requirements and/or inherent characteristics of the attribute being propagated. Any network addresses located within the radius that are not already associated with the selected attribute (e.g., do not have an existing estimate of income), may be associated with the attribute from the first network address.

Alternatively, the similarity criteria may be proximity or common assignment within an address space of the network addresses, such that the propagation software module 280 propagates attributes from a first network address to a second network address based on their proximity in address space or common assignment. The propagation software module 280 may calculate address space proximity or common assignment in various ways. For instance, the propagation software module 280 may look to contiguous blocks of addresses. A first network address and one or more attributes to propagate (e.g., a determination the network address is mobile) is selected. Network addresses within the same address block (e.g., sharing the same first three octets in an IPv4 addressing scheme) are selected. The attribute of the first address (e.g., that the network address is mobile) may then be applied to the network addresses in the address block.

Likewise, the propagation software module 280 may look to potentially non-contiguous blocks of addresses that have been classified into a common group (e.g., assigned to the same service provider). A first network address and one or more attributes to propagate (e.g., a determination that the network address is fixed) is selected. Network addresses that have been assigned to the same group (e.g., assigned to the same service provider) are selected. The attribute of the first address (e.g., that the network address is fixed) may then be applied to those network addresses.

In still another alternative, the similarity criteria may be association with a common user identifier or device identifier, such that the propagation software module 280 propagates attributes from a first network address to a second network address based on their association with a common user identifier or device identifier. The propagation may be performed directly or indirectly. For instance, for direct propagation, the propagation software module 280 determines a first network address is associated with a particular attribute (e.g., a business traveler segment), and determines a first set of user identifiers that have been associated with the first network. A set of network addresses that have been associated with at least one of the user identifiers is determined, and the set is connected to the first network address, and the particular attribute (e.g., the business traveler segment) may then be associated with those network addresses. Likewise, for indirect propagation, the propagation software module 280 determines a first network address is associated with a particular attribute (e.g., a business traveler segment), and determines a first set of user identifiers that have been associated with the first network address. The particular attribute (e.g., the business traveler segment) is then associated with each user identifier. When other network addresses are associated with the user identifiers, the particular attribute (e.g., the business traveler segment) may be associated with those network addresses.

In yet another alternative, the similarity criteria may be association with an existing common attribute, such that the propagation software module 280 propagates attributes from a first network address to a second network address based on their mutual association with an existing common attribute. The propagation software module 280 determines a first network address is associated with a particular attribute (e.g., users identified as being sports fans). One or more other network addresses that have been associated with the same attribute (e.g., users identified as being sports fans) are selected. Then, one or more other attributes (e.g., a user age distribution) associated with the first network address may be propagated to those other addresses.

In even other alternatives, the similarity criteria may be association with a common network or network node, such that the propagation software module 280 propagates attributes from a first network address to a second network address based on their association with a common network or network node. The propagation may be performed directly or indirectly. For instance, for direct propagation, the propagation software module 280 determines a first network address has been observed in communication with a particular network or network node. An attribute associated with the first network address (e.g., a classification as being mobile, user age demographics, etc.) is obtained. One or more other network addresses that have been associated with the network or network node are selected. Then, the attribute associated with the first network address (e.g., classification as being mobile, user age demographics, etc.) may be propagated to the other network addresses. Likewise, for indirect propagation, the propagation software module 280 determines a first network address has been observed in communication with a particular network or network node. An attribute associated with the first network address (e.g., stability, user age demographics, etc.) is obtained. The attribute is associated with the particular network or network node. One or more other network addresses that have been associated with the same network or network node are selected. Then, the attribute (e.g., stability, user age demographics, etc.) associated with the network or network node may be propagated to the other network addresses.

In yet other alternatives, the similarity criteria may be association with a common venue/POI or place, or attributes of a common venue/POI or place, such that the propagation software module 280 propagates attributes from a first network address to a second network address based on their association with a common venue/POI or place, or attributes of a common venue/POI or place. Again, the propagation may be performed directly or indirectly. For instance, for direct propagation, the propagation software module 280 determines a first network address is associated with one or more venues/POIs (e.g., a particular grocery store.) or a place (e.g., a particular location). One or more other network addresses that have been associated with the same one or more venues/POIs or place are selected. Then, one or more other attributes (e.g., an outdoor recreation segment, a white collar worker segment, etc.) associated with the first network address may be propagated to the other network addresses. Likewise, for indirect propagation, the propagation software module 280 determines a first network address has been is associated with one or more venues/POIs or a place. An attribute associated with the first network address (e.g., an outdoor recreation segment, a white collar worker segment, etc.) is obtained. The attribute is associated with the one or more venues/POIs or place. One or more other network addresses that have been associated with the venues/POIs or place are selected. Then, the attribute (e.g., outdoor recreation segment, white collar worker segment, etc.) associated with the one or more venues/POIs or place are propagated to the other network addresses. Similarly, direct and indirect propagation may be applied, where the similarity criteria are common association with attributes of a venue/POI or place.

Figure 17:
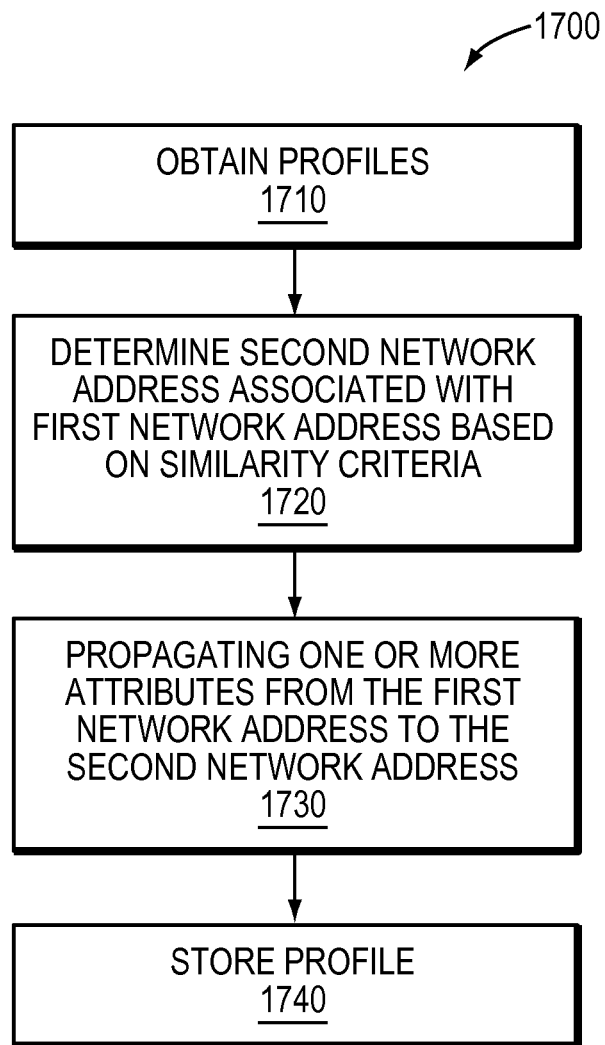
FIG. 17 is a flow diagram showing a generalized example sequence of steps that may be implemented by a propagation software module.

To summarize, the propagation software module 280 may propagate attributes associated with a first network address to be associated with at least a second network addresses determined to be sufficiently similar to the first network address based on a similarity criteria. FIG. 17 is a flow diagram showing a generalized example sequence of steps 1700 that may be implemented by the propagation software module 280. Such steps provide a high level summary of operation, and omit many of the specific details and alternatives described above, for sake of brevity. At step 1710, the propagation software module 280 obtains profiles that maintain an association between a first network address and one or more attributes. At step 1720, the propagation software module 280 determines a second network address that is associated with the first network address based on a similarity criteria, where the second network address may initially lack an association with the one or more attributes. At step 1730, the propagation software module 280 propagates one or more attributes from the first network address to the second address, to form an association between the second network address and the one or more attributes. At step 1740, the propagation software module 280 stores the association between the second network address and the one or more attributes in a profile.

CONCLUSION

It should be understood that the above described techniques and portions thereof may be utilized together, individually, or in combination with other techniques, depending on the implementation. Further, it should be understood that aspects of the techniques may be modified, added to, removed, or otherwise changed depending on the implementation. While various software modules are described as resident on particular hardware devices, it should be understood that the software modules, and portions thereof, may be otherwise located, such that operations may be performed on different devices arranged in different configurations. Operations described as being performed on separate devices may be performed on the same device, while operations described as being performed on one device may be split among multiple devices.

Further, while specific example hardware and software are discussed above, it should be understood that the technique may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory computer-readable medium, such as a volatile or persistent memory device, a hard-disk, or other data store. Combinations of software and hardware may be adapted to suit different environments and applications. Accordingly, it should be understood that the above descriptions are meant to be taken only by way of example.

What is claimed is:

1. A method for determining a network address is a proxy network address based on one or more other attributes, comprising:
    capturing observations of a network address associated with a source device in communication with a network, each network address observation captured by a source device or a network node of the network;
    determining one or more first attributes of the network address based on the captured network address observations, the one or more first attributes indicating at least an estimated location of or venue associated with the network address;
    processing the one or more first attributes, by a network address to attribute association system executed on one or more electronic devices, to use the estimated location or associated venue of the network address to determine a second attribute to be associated with the network address, the second attribute to indicate the network address is a proxy network address, the processing to at least one of compare distance from the location of each network address observation to the estimated location of the network address or access side-information associated with the venue but not directly associated with the network address;
    storing, by the network address to attribute association system, a record in the database that maintains the association between the second attribute and the network address, the database stored in a storage device of the one or more electronic devices; and
    providing an output to a service provider that includes the second attribute to cause the network address to be handled differently than non-proxy network addresses.

2. The method of claim 1, wherein the network address is an Internet Protocol (IP) address associated with the source device.

3. The method of claim 1, wherein the first attribute also indicates a temporal property of the network address.

4. The method of claim 1, wherein the first attribute indicates the estimated location of the network address, the network address observations each are associated with a location, and the applying calculates a root mean-squared (RMS) distance from the location of each network address observation to an estimated location of the network address, and compares the RMS distance to a predetermined threshold to determine the network address is a proxy network address.

5. The method of claim 1, wherein the first attribute indicates the venue associated with the network address, and the applying determines the side-information from a third-party data provider associated with the venue, and based on the side-information determines the network address is a proxy network address.

6. A non-transitory electronic-device readable medium having executable instructions stored thereon, the executable instructions when executed by one or more processors of one or more electronic devices operable to:
    capture observations of a network address associated with a source device in communication with a network, each network address observation captured by a source device or a network node of the network;
    determine one or more first attributes of the network address based on the captured network address observations, the one or more first attributes indicating at least an estimated location of or venue associated with the network address;
    process the one or more first attributes to use the estimated location or associated venue of the network address to determine a second attribute to be associated with the network address, the second attribute to indicate the network address is a proxy network address, the executable instructions to process operable to at least one of compare distance from the location of each network address observation to the estimated location of the network address or access side-information associated with the venue but not directly associated with the network address;
    store a record that maintains the association between the second attribute and the network address in a database; and
    provide an output to a service provider that includes the second attribute to cause the network address to be handled differently than non-proxy network addresses.

7. The non-transitory electronic-device readable medium of claim 6, wherein the network address is an Internet Protocol (IP) address associated with the source device.

8. The non-transitory electronic-device readable medium of claim 6, wherein the first attribute also indicates a temporal property of the network address.

9. A method for determining a network address is a mobile-location network address based on one or more other attributes, comprising:
    capturing observations of a network address associated with a source device in communication with a network, each network address observation captured by a source device or a network node of the network;
    associating at least one of a user identifier and location or a time and location with each of the observations of the network address;
    processing the observations, by a network address to attribute association system executed on one or more electronic devices, to use the estimated identifier and location or a time and location of each of the observations of the network address to determine an attribute to be associated with the network address, the attribute to indicate the network address is a mobile-location network address, the processing to at least one of compare spatial extents of network address observations whose user identifier indicates they are of a same user to a predetermined threshold or compare spatial extents of network address observations whose time indicates they are of a same time window to a predetermined threshold to determine the network address is a mobile-location network address; and
    providing an output to a service provider that cause the network address to be handled differently than fixed-location network addresses.

10. The method of claim 9, wherein the associating associates the user identifier and location with each of the observations of the network address and the processing comprises comparing the spatial extents of network address observations whose user identifier indicates they are of the same user to the predetermined threshold to determine the network address is a mobile-location network address.

11. The method of claim 9, wherein the associating associates the time and location with each of the observations of the network address and the processing comprises comparing spatial extents of network address observations whose time indicates they are of the same time window to the predetermined threshold to determine the network address is a mobile-location network address.

* * * * *